(12) United States Patent
Anderson et al.

(10) Patent No.: US 9,814,186 B2
(45) Date of Patent: Nov. 14, 2017

(54) GROWING SYSTEM

(71) Applicant: Living Greens Farm, Inc., Faribault, MN (US)

(72) Inventors: Dana Anderson, Prior Lake, MN (US); Raymond L. Carriere, Farmington, MN (US); Daniel Lagro, Northfield, MN (US)

(73) Assignee: Living Greens Farm, Inc., Faribault, MN (US)

( * ) Notice: Subject to any disclaimer, the term of this patent is extended or adjusted under 35 U.S.C. 154(b) by 126 days.

(21) Appl. No.: 14/815,472

(22) Filed: Jul. 31, 2015

(65) Prior Publication Data

US 2016/0029582 A1 Feb. 4, 2016

Related U.S. Application Data

(60) Provisional application No. 62/031,668, filed on Jul. 31, 2014, provisional application No. 62/032,452, filed on Aug. 1, 2014, provisional application No. 62/174,940, filed on Jun. 12, 2015, provisional application No. 62/050,075, filed on Sep. 12, 2014.

(51) Int. Cl.
*A01G 31/06* (2006.01)
*A01G 7/04* (2006.01)

(52) U.S. Cl.
CPC ............ *A01G 7/045* (2013.01); *A01G 31/06* (2013.01); *Y02P 60/146* (2015.11); *Y02P 60/216* (2015.11)

(58) Field of Classification Search
CPC .......... A01G 7/045; A01G 7/04; A01G 31/06; A01G 31/02; A01G 9/24; A01G 9/26

USPC ..................... 47/58.1 R, 58.1 LS
See application file for complete search history.

(56) References Cited

U.S. PATENT DOCUMENTS

| 3,181,273 A | 5/1965 | West et al. |
| 3,708,009 A | 1/1973 | Viol et al. |
| 3,729,016 A | 4/1973 | Von Linsowe |

(Continued)

FOREIGN PATENT DOCUMENTS

| JP | 05146231 | 6/1993 |
| JP | 07034696 B2 | 4/1995 |

(Continued)

OTHER PUBLICATIONS

PCT Search Report Written Opinion for PCT/US2015/043277, dated Sep. 30, 2015.

(Continued)

*Primary Examiner* — Joshua D Huson
(74) *Attorney, Agent, or Firm* — Hamilton IP Law, PC; Jay R. Hamilton; Charles Damschen

(57) ABSTRACT

A growing system and/or plant support structure may include one or more feet supporting at least one or more uprights, on which a plurality of plants and/or grow boards for growing plants may be positioned. A nutrient delivery system may be positioned between opposing uprights to provide nutrient supply to a root zone of plants, which nutrient delivery system may be positioned adjacent each opposing upright in an interior chamber of the plant support structure. A light system may be positioned between two adjacent plant support structures such that it simultaneously provides light to the exterior surface of the two plant support structures.

12 Claims, 33 Drawing Sheets

(56) References Cited

U.S. PATENT DOCUMENTS

| | | |
|---|---|---|
| 3,729,141 A | 4/1973 | Cornelius |
| 3,749,319 A | 7/1973 | Fischer |
| 3,874,721 A | 4/1975 | Tuggle |
| 3,888,041 A | 6/1975 | Bundy et al. |
| 4,006,559 A | 2/1977 | Carlyon, Jr. |
| 4,035,950 A | 7/1977 | Anselm |
| 4,047,327 A | 9/1977 | Tescher |
| 4,052,196 A | 10/1977 | Namy et al. |
| 4,059,922 A | 11/1977 | Digiacinto |
| 4,099,669 A | 7/1978 | Cortopassi |
| 4,244,145 A | 1/1981 | Polacsek |
| 4,295,607 A | 10/1981 | Noble |
| 4,309,844 A | 1/1982 | King et al. |
| 4,332,105 A | 6/1982 | Nir |
| 4,352,460 A | 10/1982 | Purtell |
| 4,419,843 A | 12/1983 | Johnson, Sr. |
| 4,505,068 A | 3/1985 | Kaneko |
| 4,569,150 A | 2/1986 | Carlson et al. |
| 4,584,791 A | 4/1986 | Wolf |
| 4,603,077 A | 7/1986 | Fujimoto et al. |
| 4,658,878 A | 4/1987 | Williams |
| 4,713,909 A | 12/1987 | Roper et al. |
| 4,813,176 A | 3/1989 | Takayasu |
| 4,844,109 A | 7/1989 | Navarro |
| 4,869,019 A | 9/1989 | Ehrlich |
| 4,924,623 A | 5/1990 | van Rens |
| 4,965,962 A | 10/1990 | Akagi |
| 4,982,526 A | 1/1991 | Miyachi |
| 5,040,329 A * | 8/1991 | Michaloski ............... A01G 7/00 47/1.1 |
| 5,042,196 A | 8/1991 | Lukawski |
| 5,076,008 A | 12/1991 | Arroyo |
| 5,077,935 A | 1/1992 | Stoever et al. |
| 5,226,255 A | 7/1993 | Robertson |
| 5,317,834 A | 6/1994 | Anderson |
| 5,397,056 A | 3/1995 | Sakatani et al. |
| 5,417,010 A | 5/1995 | Ecer |
| 5,435,098 A | 7/1995 | Koide et al. |
| 5,560,415 A | 10/1996 | Geissler |
| 5,724,768 A | 3/1998 | Ammann |
| 5,862,628 A | 1/1999 | Takashima |
| 5,918,416 A | 7/1999 | Ammann |
| 5,937,575 A | 8/1999 | Zobel et al. |
| 6,000,173 A * | 12/1999 | Schow ................... A01G 31/02 47/59 R |
| 6,006,471 A | 12/1999 | Sun |
| 6,021,602 A | 2/2000 | Orsi |
| 6,061,957 A | 5/2000 | Takashima |
| 6,070,358 A | 6/2000 | Meikle et al. |
| 6,082,044 A | 7/2000 | Sherfield |
| 6,105,309 A | 8/2000 | Takayanagi |
| 6,127,027 A | 10/2000 | Nogami et al. |
| 6,131,832 A | 10/2000 | Murphy |
| 6,219,965 B1 | 4/2001 | Ishikawa et al. |
| 6,237,282 B1 | 5/2001 | Pitts |
| 6,312,139 B1 | 11/2001 | Baker et al. |
| 6,360,482 B1 | 3/2002 | Boyes |
| 6,360,483 B1 | 3/2002 | Sherfield |
| 6,446,386 B1 | 9/2002 | Holloway |
| 6,508,033 B2 | 1/2003 | Hessel et al. |
| 6,578,319 B1 | 6/2003 | Cole et al. |
| 6,615,542 B2 | 9/2003 | Ware |
| 6,698,668 B2 | 3/2004 | Stehling |
| 6,729,807 B1 | 5/2004 | Spittle |
| 6,793,438 B2 | 9/2004 | Anderson |
| 6,807,770 B2 | 10/2004 | Wainwright et al. |
| 6,811,653 B2 | 11/2004 | Huang |
| 7,426,802 B2 | 9/2008 | Umbaugh |
| 8,181,391 B1 | 5/2012 | Giacomantonio |
| 8,533,992 B2 | 9/2013 | Harwood |
| 2003/0006323 A1 | 1/2003 | Reid |
| 2003/0089037 A1 | 5/2003 | Ware |
| 2003/0121362 A1 | 7/2003 | Goellner |
| 2003/0150160 A1 | 8/2003 | Anderson |
| 2003/0188477 A1 | 10/2003 | Pasternak et al. |
| 2006/0032128 A1 | 2/2006 | Bryan |
| 2006/0053691 A1 | 3/2006 | Harwood et al. |
| 2008/0295400 A1 | 12/2008 | Harwood et al. |
| 2009/0272029 A1 * | 11/2009 | Aiking .................... A01G 7/04 47/1.43 |
| 2010/0193707 A1 * | 8/2010 | Yamada .................. A01G 7/04 250/492.1 |
| 2011/0016785 A1 * | 1/2011 | Yamada ................. A01G 7/045 47/1.01 R |
| 2011/0146146 A1 | 6/2011 | Harwood |
| 2011/0258925 A1 | 10/2011 | Baker |
| 2012/0005957 A1 | 1/2012 | Downs |
| 2012/0085026 A1 | 4/2012 | Morris |
| 2014/0137472 A1 | 5/2014 | Anderson et al. |
| 2015/0102137 A1 | 4/2015 | Anderson et al. |

FOREIGN PATENT DOCUMENTS

| | | |
|---|---|---|
| JP | 07327520 A | 12/1995 |
| JP | 409154417 | 6/1997 |
| TW | M450203 U1 | 4/2013 |

OTHER PUBLICATIONS

PCT Search Report Written Opinion for PCT/US2013/045003, dated Oct. 28, 2013.

Search Report and Written Opinion for PCT/US2013/032492, dated May 30, 2013.

* cited by examiner

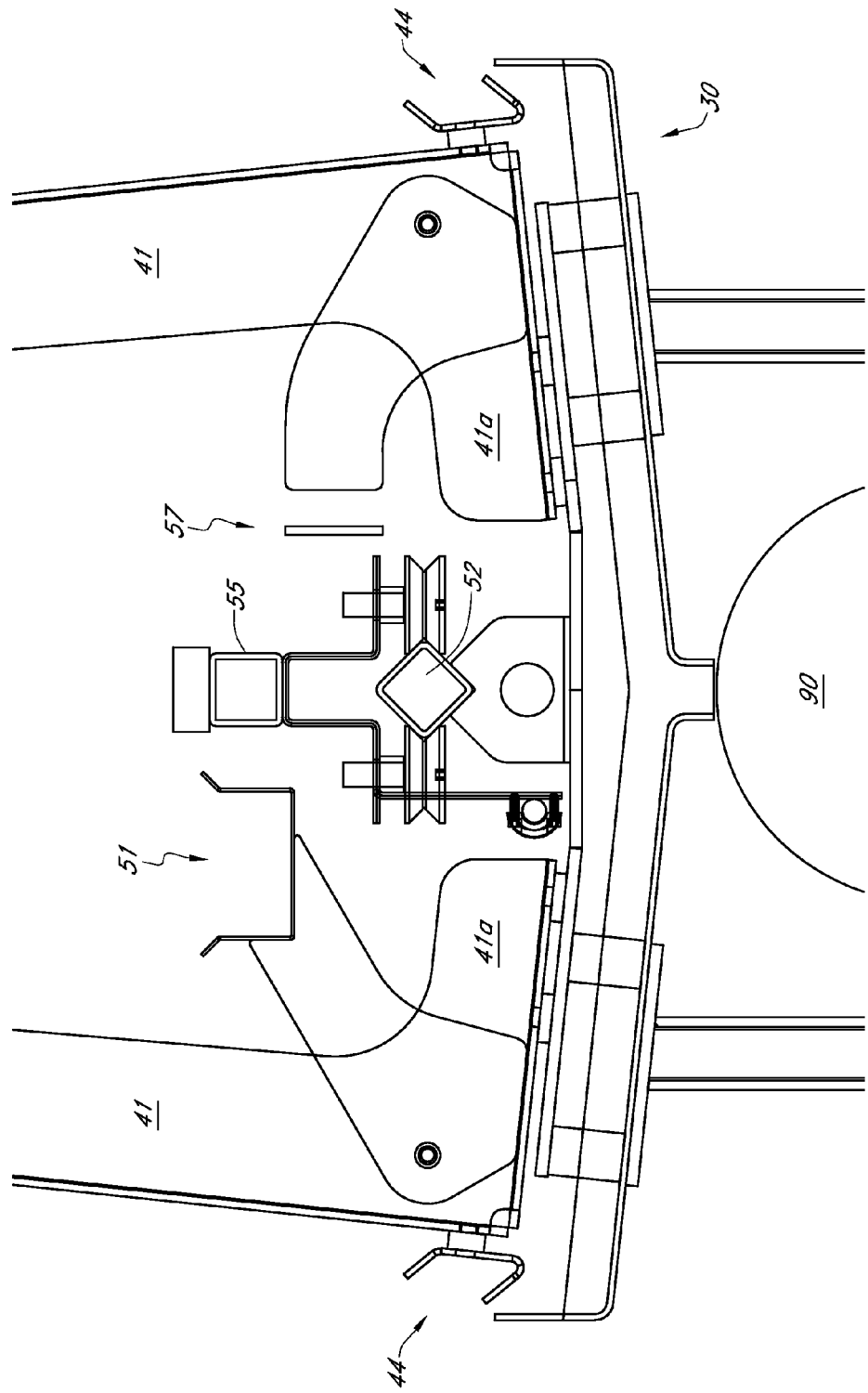

GROWING SYSTEM

CROSS REFERENCE TO RELATED APPLICATIONS

This non-provisional utility patent application claims the filing priority from provisional U.S. Pat. App. Nos. 62/031,668 filed on Jul. 31, 2014; 62/032,452 filed on Aug. 1, 2014; 62/050,075 filed on Sep. 12, 2014; and 62/174,940 filed on Jun. 12, 2015, all of which are incorporated by reference herein in their entireties.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

FIELD OF INVENTION

The present invention relates generally to agriculture, and more specifically to hydroponic and/or aeroponic methods and apparatuses.

BRIEF DESCRIPTION OF DRAWINGS

The accompanying drawings, which are incorporated in and constitute a part of this specification, illustrate embodiments and together with the description, serve to explain the principles of the methods and systems.

FIG. 21B provides a detailed view of a portion of the foot shown in FIG. 21A.

DESCRIPTION OF INVENTION

Figure 1:
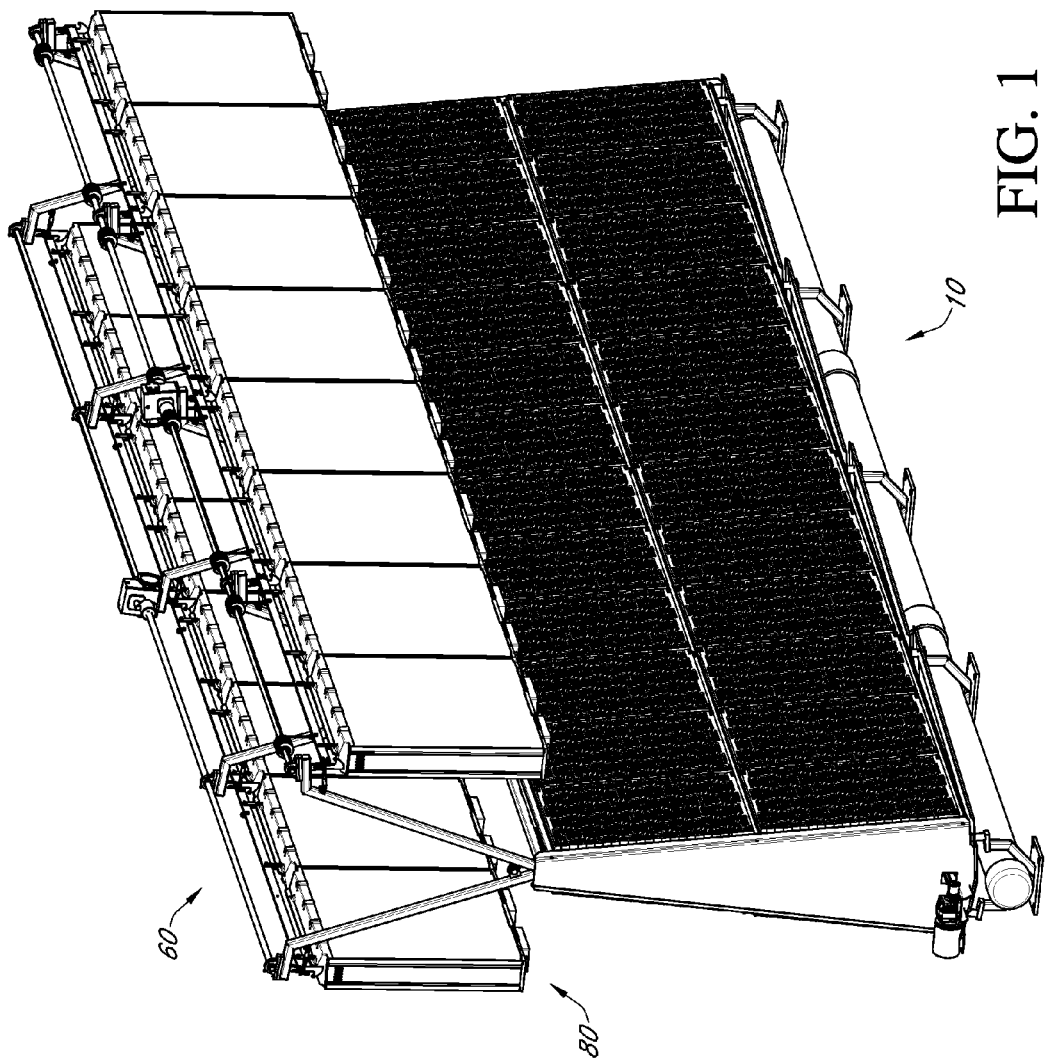
FIG. 1 provides a perspective view of various aspects of a growing system.

| Element Description | Element Number |
| --- | --- |
| Growing system | 10 |
| Grow board | 12 |
| Plant support structure | 14 |
| Aisle | 16 |
| Foot | 20 |
| Tab | 21 |
| Base | 22 |
| Track | 23 |
| Angled member | 24 |
| Upright member | 25 |
| Gutter | 26 |
| Lateral member | 28 |
| Tray | 30 |
| Trough | 32 |
| Aperture | 32a |
| Lip | 34 |
| Side pane | 36 |
| Board frame | 40 |
| Upright | 41 |
| Upright base | 41a |
| Bottom rail | 42 |

| Element Description | Element Number |
| --- | --- |
| Cross member | 43 |
| Intermediate rail | 44 |
| Upper lip | 44a |
| Lower lip | 44b |
| Drain | 44c |
| Adapter bracket | 45 |
| Top rail | 46 |
| Pan | 47 |
| Pan top lip | 47a |
| Pan bottom lip | 47b |
| Cap | 48 |
| Guide | 48a |
| Wing | 48b |
| Nutrient delivery system | 50 |
| Channel | 51 |
| Guide | 52 |
| Mast | 53 |
| Nutrient supply outlet | 53a |
| Motor | 54 |
| Coupler | 55 |
| Base member | 56 |
| Sensor | 57 |
| Light support | 60 |
| Extension | 61 |
| Distal tab | 61a |
| Keeper | 62 |
| Motor | 63 |
| Bar | 64 |
| Spool | 66 |
| Connector | 68 |
| Safety lock | 70 |
| Latch | 72 |
| Actuator | 74 |
| Light system | 80 |
| Support frame | 80a |
| Void | 80b |
| Air conduit | 81 |
| Panel | 82 |
| Light source | 83 |
| Top bar | 84 |
| Light cover | 85 |
| Electronics | 86 |
| Collection member | 90 |
| Trolley | 100 |
| Trolley base | 102 |
| Trolley upright | 104 |
| Trolley wheel | 106 |
| Track wheel | 106a |

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

A first illustrative embodiment of a growing system 10 and plant support structure 14 is shown in perspective in FIG. 1, wherein a plurality of grow boards 12 are shown engaged with a board frame 40. It is anticipated that in an aspect of a growing system 10 disclosed and claimed herein is that it may be used in agriculture. For example, the growing system 10 may be incorporated with various aeroponic agriculture systems, including but not limited to the various apparatuses and methods disclosed in U.S. patent application Ser. No. 13/914,243, which is incorporated by reference herein in its entirety. Accordingly, the board frame 40 may be configured such that a plurality of grow boards 12 may be simultaneously engaged with the board frame 40. Without limitation, the specific grow board 12 used with any embodiment of a growing system 10 may be any suitable grow board 12 for the particular application of the growing system 10, including but not limited to those disclosed in U.S. patent application Ser. No. 14/752,462, which is incorporated by reference herein in its entirety.

Generally, it is contemplated that in an aspect of a growing system 10 a plurality of plants may be positioned adjacent one or more grow boards 12 such that a nutrient delivery system 50 may provide nutrient supply to a root portion of the plants from an interior side of the grow board 12. Furthermore, it is contemplated that a light system 80 and/or ventilation system may provide light and/or carbon dioxide to a leaf/stem portion of the plants from an exterior side of the grow board 12. Generally, as used herein, the terms "interior side," "interior surface," "interior chamber," and "interior" of a growing system 10 or component thereof may constitute the surface generally facing the root portion of a plant, which generally may be between adjacent uprights 41 from the vantage shown in FIGS. 4 and 12, and the terms "exterior side," "exterior surface," "exterior chamber," and "exterior" of a growing system 10 or component thereof may constitute the surface generally facing the portion of the plant other than the roots thereof, which generally may be outside adjacent uprights 41 from the vantage shown in FIGS. 4 and 12. In many applications the interior of a growing system 10 or component thereof may be oriented toward a nutrient supply and/or nutrient delivery system 50, and an exterior of a growing system 10 or component thereof may be oriented away from a nutrient supply and/or nutrient delivery system 50.

Figure 6:
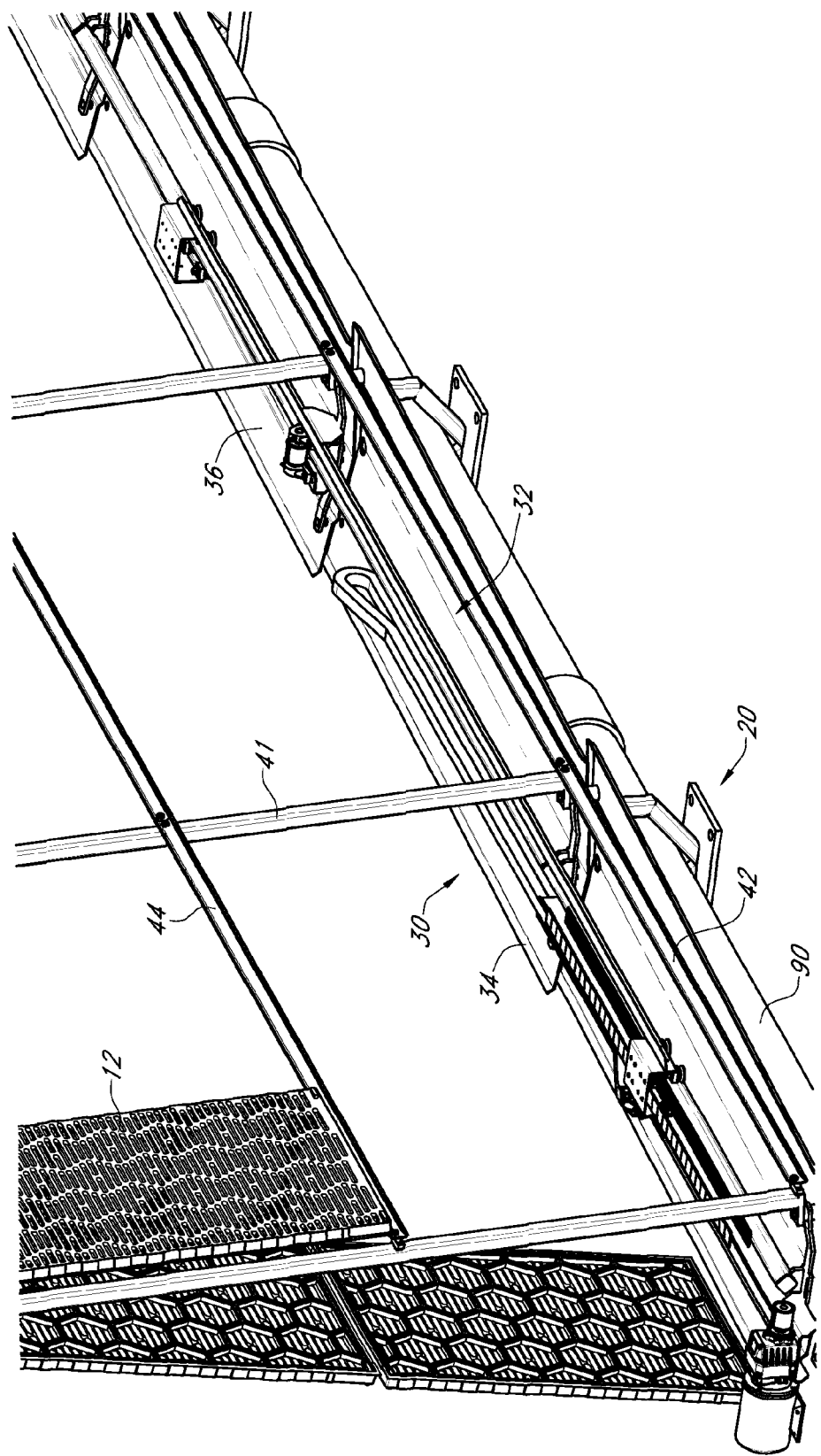
FIG. 6 provides a perspective view of a lower portion of the growing system shown in FIGS. 1-5.
Figure 7:
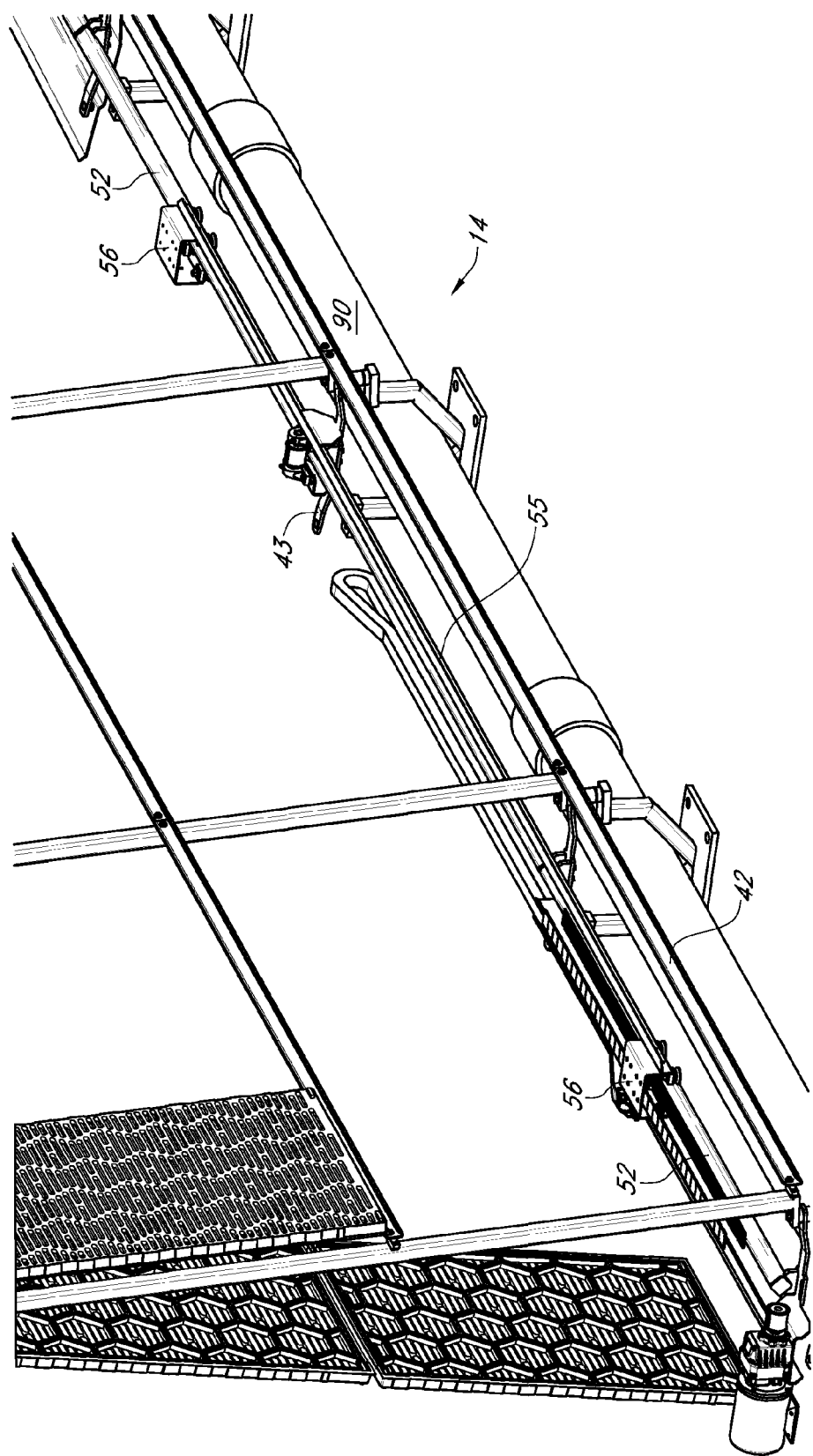
FIG. 7 provides another perspective view of a lower portion of the growing system shown in FIGS. 1-6.
Figure 23A:
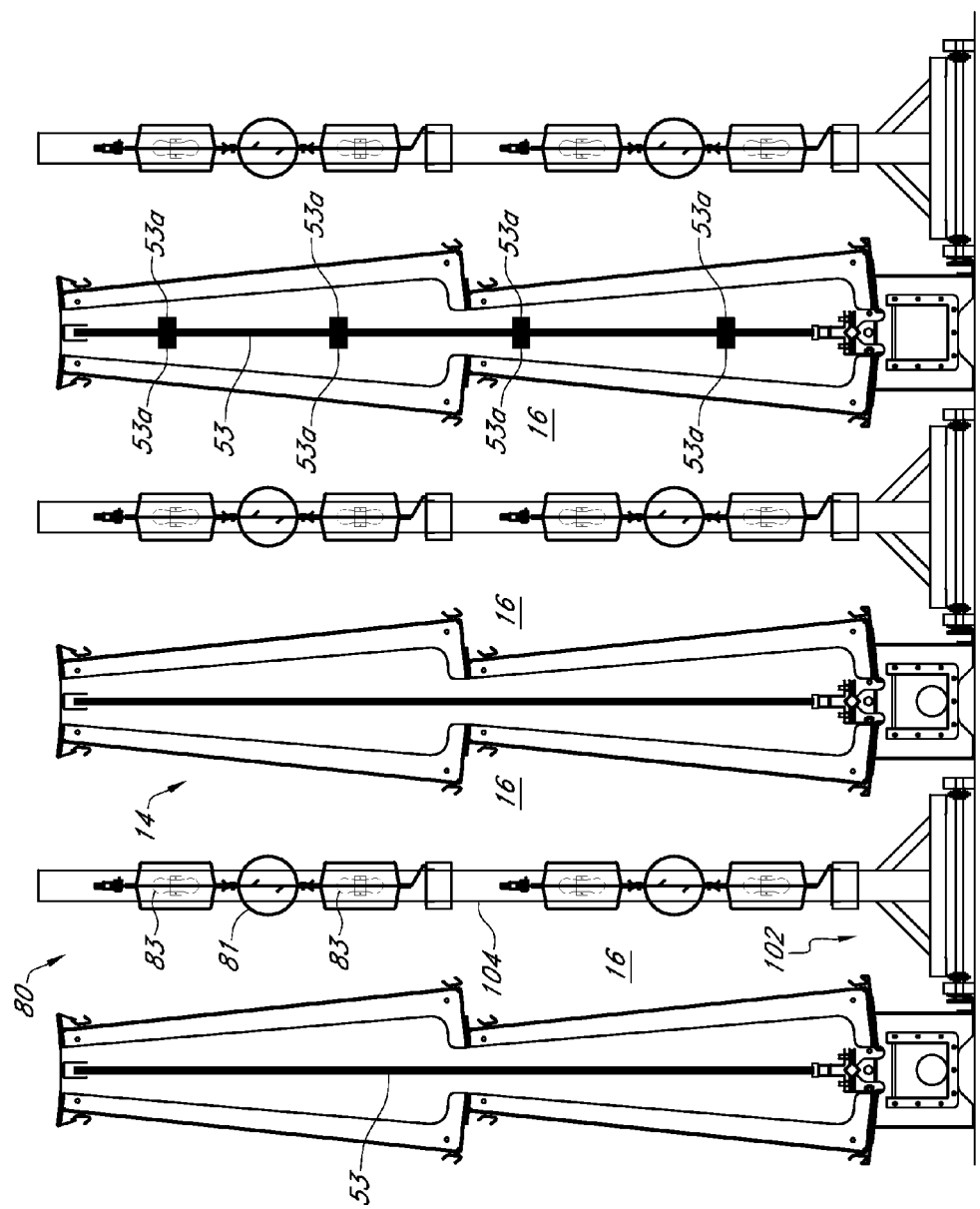
FIG. 23A provides an end view of a growing system with a horizontally moveable light system positioned in an aisle.

An aspect of a nutrient delivery system 50 may include a guide 52 along which one or more base members 56 may travel, wherein a coupler 55 may engage one base member 56 with another, as shown in FIGS. 6 & 7. A motor 54 may be employed to provide the motive force to one or more base members 56. A nutrient supply outlet 53*a* may be engaged with one or more of the base members 56 via a mast 53, which mast 53 may be configured as a generally vertical pipe and/or tube having various spray nozzles thereon. The rightmost plant support structure 14 shown in FIG. 23A is depicted having a mast 53 and various nutrient supply outlets 53*a* positioned along the height of the mast 53. Generally, in an aspect all or a portion of the nutrient supply outlet 53*a* may be configured as a nozzle. However, other nutrient supply outlets 53*a* and/or nutrient delivery systems 50 may be used with the growing system 10 disclosed herein, and the specific nutrient delivery system 50, structures, and/or methods employed to deliver nutrient supply to a plant in no way limits the scope of the present disclosure unless so indicated in the following claims. Only the rightmost plant support structure 14 in FIG. 23A is shown with a nutrient delivery system 50 having a nutrient supply outlet 53*a* for purposes of clarity. However, it is contemplated that each plant support structure 14 may employ a corresponding nutrient delivery system 50 on the interior thereof, and that each nutrient delivery system 50 may be comprised of at least one nutrient supply outlet 53*a* without limitation unless so indicated in the following claims.

Figure 19A:
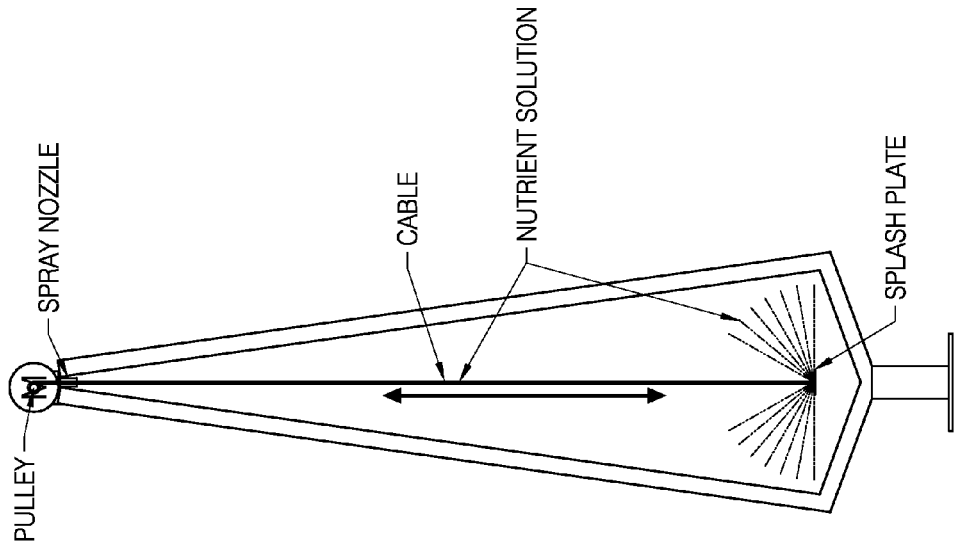
FIG. 19A provides a schematic end view of a nutrient supply system.
Figure 19B:
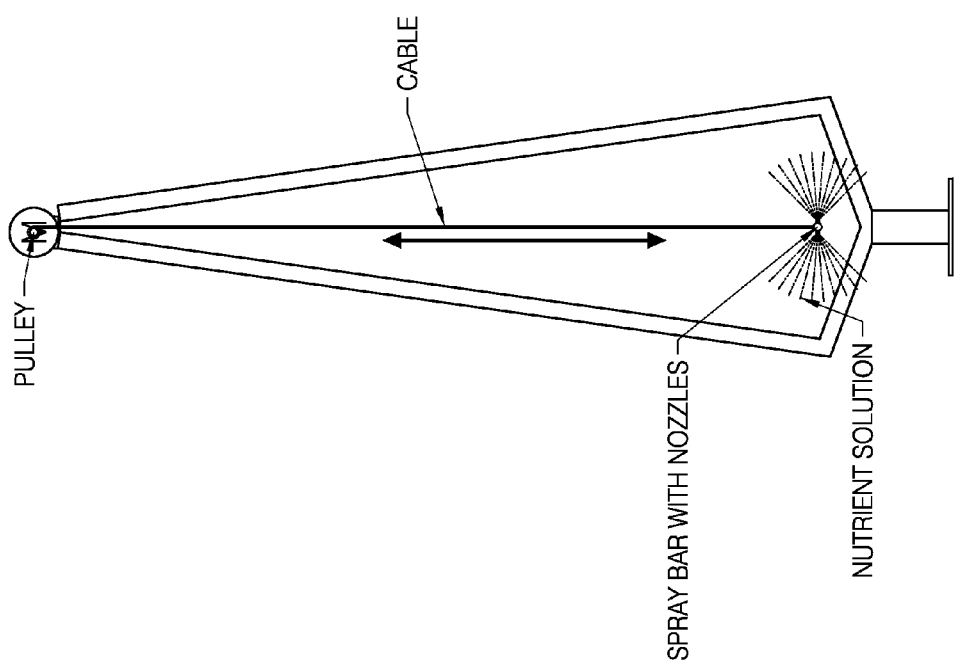
FIG. 19B provides a schematic end view of another nutrient supply system.

Generally, it is contemplated that it may be advantageous for a nutrient delivery system 50 to be configured so that a given nozzle and/or nutrient supply outlet 53*a* may provide nutrient supply to an area greater than the spray pattern of that given nozzle and/or nutrient supply outlet 53*a*. Such configurations may include, but are not limited to, horizontally moving masts 53, spray bars, nozzles, and/or nutrient supply outlets 53*a*, vertically moving masts 53, spray bars, nozzles, and/or nutrient supply outlets 53*a*, moving plant support structures and/or portions thereof, moving splash and/or deflector plates, and/or combinations thereof. For example, FIG. 19A shows various aspects of a nutrient delivery system 50 employing a vertically moveable nozzle(s), whereas FIG. 19B shows various aspects of a nutrient delivery system 50 employing a vertically moveable splash plate. In an aspect, the splash plate may serve to reduce the particle size of the nutrient supply to a suitable size for optimal plant growth. Other such methods and structures are disclosed in U.S. patent application Ser. No. 13/914,243, and will therefore not be described in further detail herein for purposes of brevity.

One aspect of a growing system 10 may include at least one foot 20 to provide a structural base for various components of the growing system 10, which may generally include a plant support structure 14. In an aspect of a foot 20, the foot 20 may include a base 22 with two angled members 24 extending therefrom, and corresponding upright members 25 extending from the respective angled members 24, which is shown clearly at least in FIGS. 4 & 5. Such a configuration may reduce the actual floor space required for a growing system 10 and may provide an open space having a predetermined height from the floor adjacent either side of the growing system 10. In a configuration wherein multiple growing systems 10 are positioned adjacent one another in rows, this configuration may allow a vehicle designed traverse the space between rows (which space between rows of growing systems 10 may be referred to herein as aisles 16) to have a wider wheelbase than may otherwise be possible.

Figure 2:
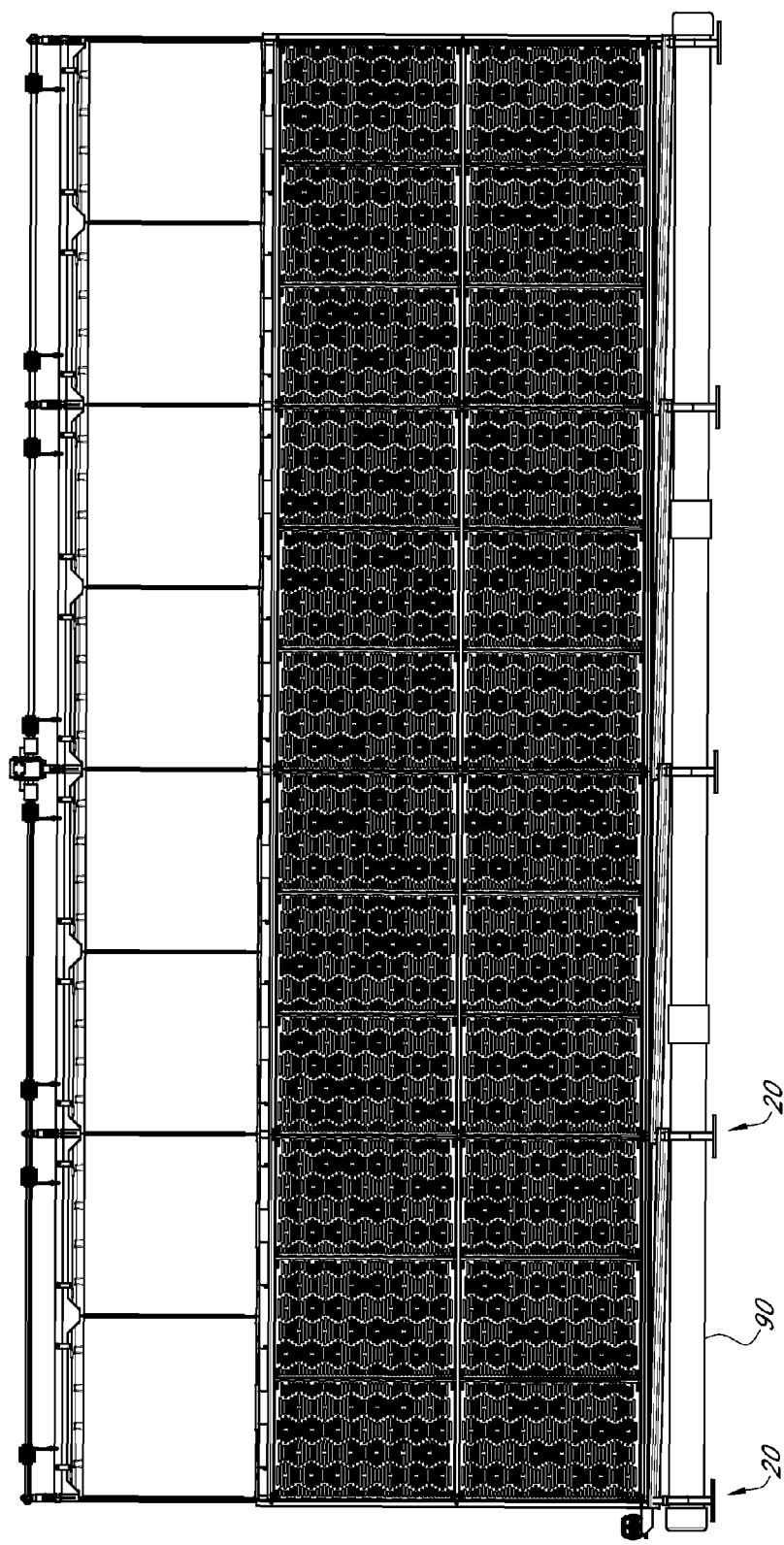
FIG. 2 provides a side view of the growing system shown in FIG. 1.

One or more trays 30 may be engaged with a foot 20 and/or adjacent feet 20 directly and/or via one or more adapter brackets 45. A tray 30 may be formed with two side panes 36 angled downward to a central trough 32. The low end of the trough 32 may be formed with an aperture 32*a* therein, as shown clearly at least in FIGS. 5 & 6. A lip 34 may be formed around the periphery of the tray 30. Nutrient supply not absorbed by the plants may drain into the trays 30 and flow via gravity to the aperture 32*a*, which may be in fluid communication with a collection member 90 (one aspect of which may be formed as a tube). A single growing system 10 and/or plant support structure 14 may be formed with a plurality of trays 30 each draining into a common collection member 90. Each tray 30 may be similarly angled to provide a gravity drain, as shown at least in FIGS. 1 & 2. Using a plurality of trays 30 along the length of the growing system 10 and/or plant support structure 14 may require less of a total vertical difference between the high end of a tray 30 and the low end thereof than if a single long tray 30 is used.

From the collection member 90, the nutrient supply may be filtered/treated/adjusted and/or recycled to the nutrient delivery system 50. One or more growing systems 10 may share a common collection member 90 without limitation unless so indicated in the following claims, or each growing system 10 may have a dedicated collection member 90. Accordingly, other collection members 90 may be used with the growing system 10 disclosed herein, and the specific collection member 90, structures, and/or methods employed to collect, recycle, treat, and/or adjust nutrient supply in no way limits the scope of the present disclosure unless so indicated in the following claims. Various such methods and structures are disclosed in U.S. patent application Ser. No. 13/914,243, and will therefore not be described in further detail herein for purposes of brevity.

In one aspect of a board frame 40, an upright 41 may extend from each upright member 25 of a foot 20 in a generally vertically angled direction such that corresponding uprights 41 may form an acute angle with respect to one another. The bottom end of each upright 41 may be engaged with the distal end of each upright member 25 and/or an adapter bracket 45 engaged with each upright member 41. Additionally, a cross member 43 may be engaged with either upright member 25 on a foot 20 as shown at least in FIG. 7. A bottom rail 42 may extend from the bottom end of one upright 41 to the bottom end of the adjacent upright 41. The bottom rail 42 may at least serve to support one or more grow boards 12 as discussed in further detail below. An intermediate rail 44 may extend from a position between the two ends of one upright 41 to a corresponding position on an adjacent upright 41. The intermediate rail 44 may at least serve to support one or more grow boards 12 as discussed in further detail below. A top rail 46 may extend from the top end of one upright 41 to the top end of an adjacent upright 41.

Figure 8:
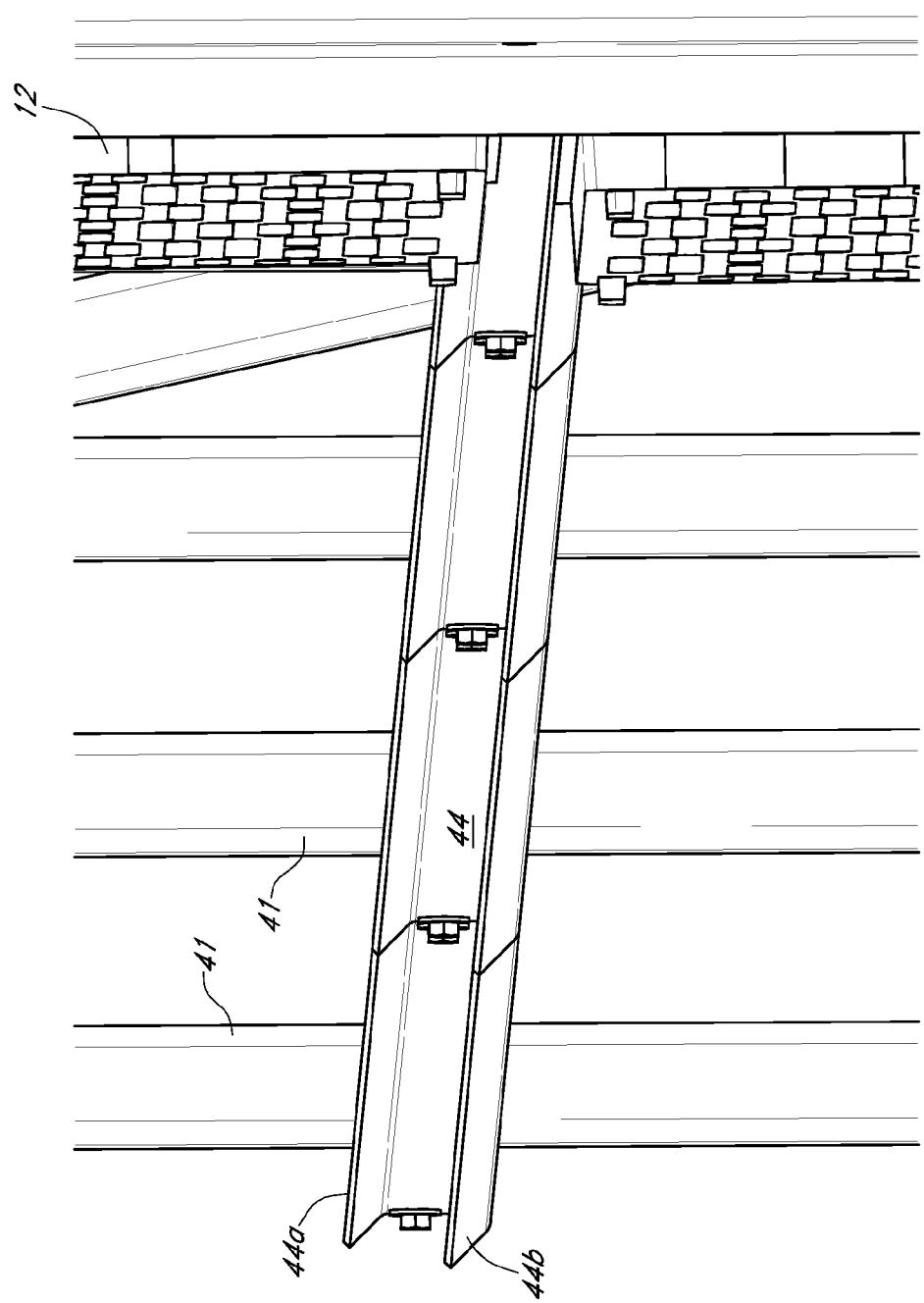
FIG. 8 provides a perspective view of an intermediate portion of the growing system shown in FIGS. 1-7.
Figure 9:
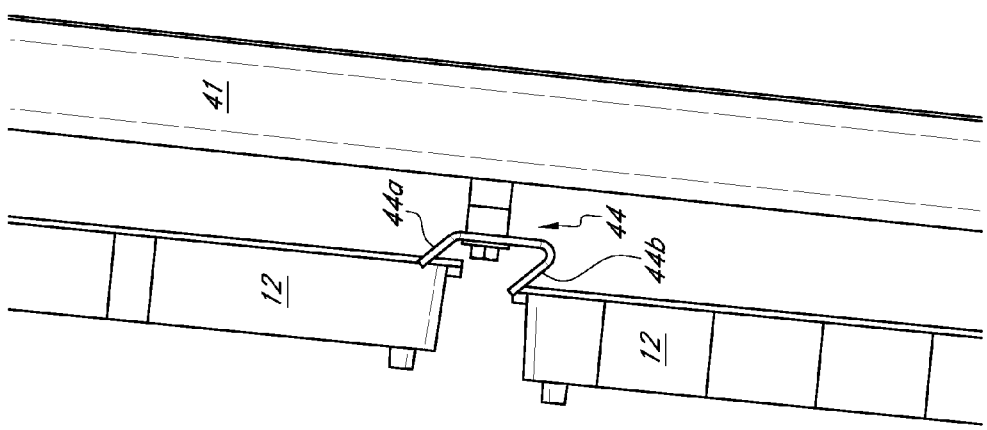
FIG. 9 provides an end view of the intermediate portion shown in FIG. 8.
Figure 10:
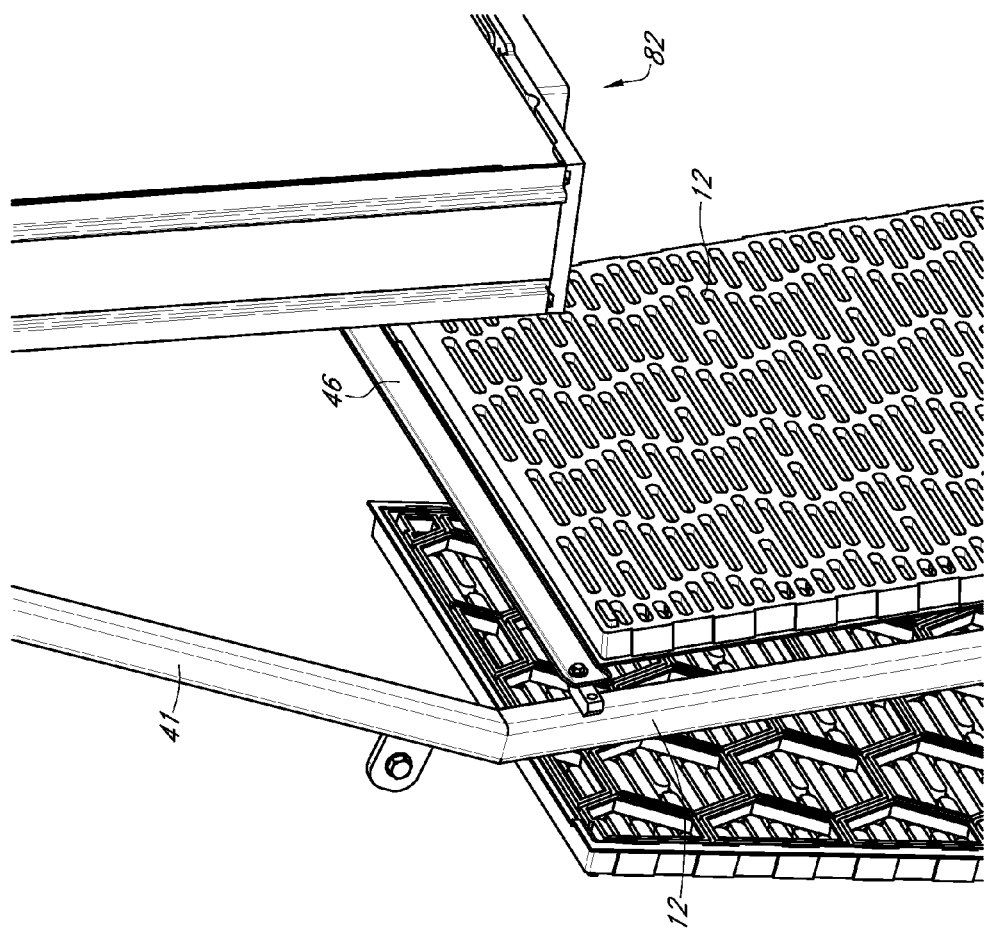
FIG. 10 provides a perspective view of a top portion of the growing system shown in FIGS. 1-9.

As shown at least in FIGS. 8 & 9, the rails 42, 44, 46 may be formed with an upper lip 44*a* and a lower lip 44*b*. The lips 44*a*, 44*b* may be configured such that nutrient supply directed toward the interior surface of a grow board 12 does not reach the exterior surface of the grow board 12, or such that a reduced portion of the nutrient supply reaches the exterior surface of the grow board 12. In an aspect of such a configuration, the upper lip 44*a* may extend beyond the lower edge of a grow board 12 positioned adjacent the upper lip 44a and the lower lip 44b may be configured such that a flap on the upper edge of a grow board 12 positioned adjacent the lower lip 44b fits over a portion of the lower lip 44b. This configuration may allow the grow board 12 to be supported by the lower lip 44b via the engagement between the lower lip 44b and the upper edge of a grow board 12 (e.g., the grow board 12 may hang from the lower lip 44b and a bottom portion of the grow board 12 may rest against the upper lip 44a). However, any suitable structure and/or method designed to mitigate and/or prevent nutrient supply from passing from the interior surface of a grow board 12 to the exterior surface thereof may be used with the growing system 10 without limitation unless so indicated in the following claims, as may any suitable structure and/or method designed to support one or more grow boards 12.

The various elements of a foot 20, tray 30, and/or board frame 40 may be separately formed and later engaged with one another, via, for example, mechanical fasteners, chemical adhesives, and/or combinations thereof without limitation unless so indicated in the following claims. Alternatively, some and/or all of the elements may be integrally formed with one another without limitation unless so indicated in the following claims. These elements may be constructed of any material suitable for the particular application thereof, including but not limited to polymers, plastics, metals and their alloys, natural materials, and/or combinations thereof. The various elements of a foot 20, tray 30, and/or board frame 40 may be configured to provide a system with a predetermined load-bearing capacity for support of one or more grow boards 12 having a plurality of plants positioned thereon of various weights. Accordingly, the scope of the present disclosure is in no way limited by specific weight, capacity, and/or size of any of the elements of the growing system 10 unless so indicated in the following claims.

Figure 3:
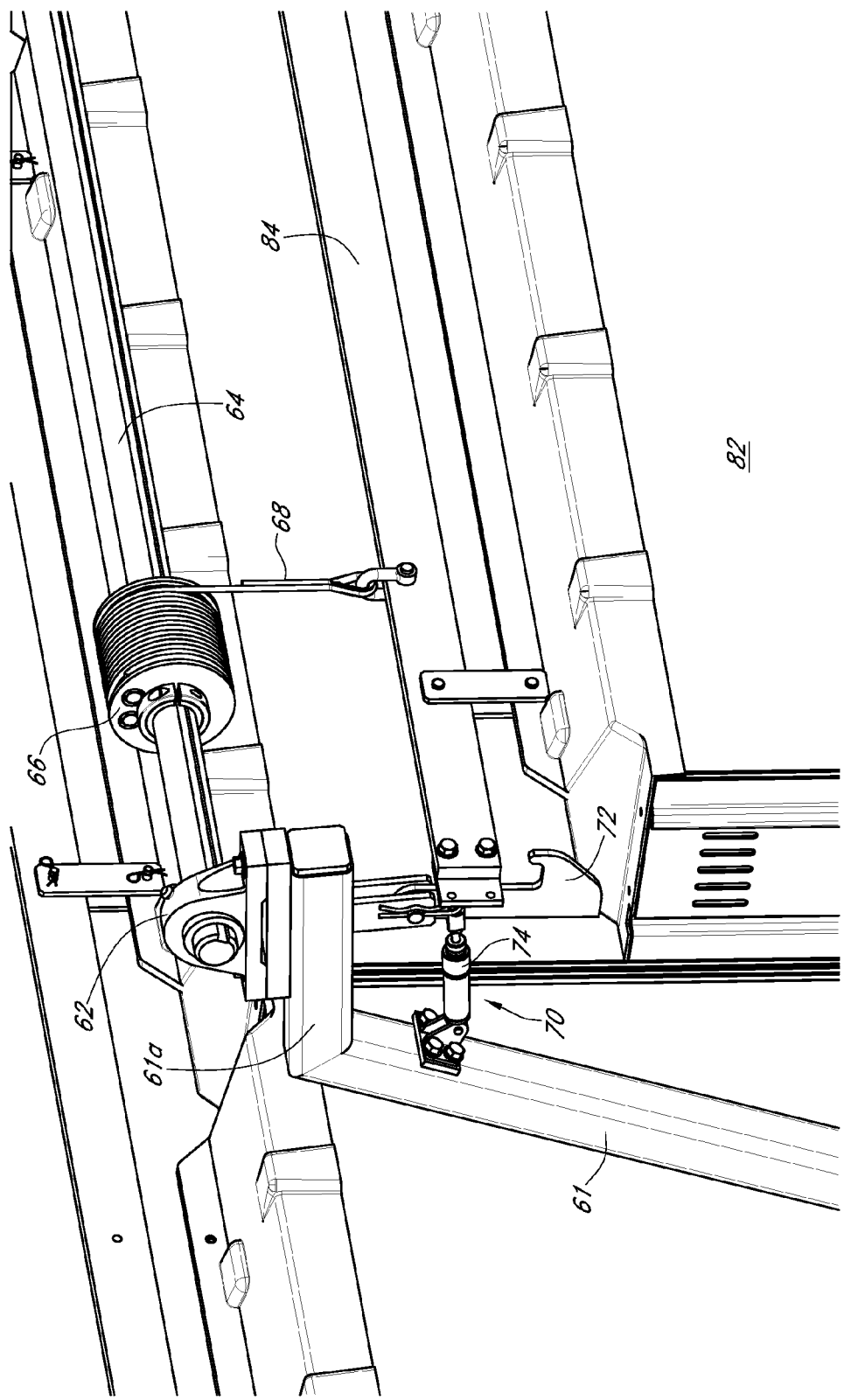
FIG. 3 provides a detailed view of an upper portion of the growing system shown in FIGS. 1 & 2.
Figure 4:
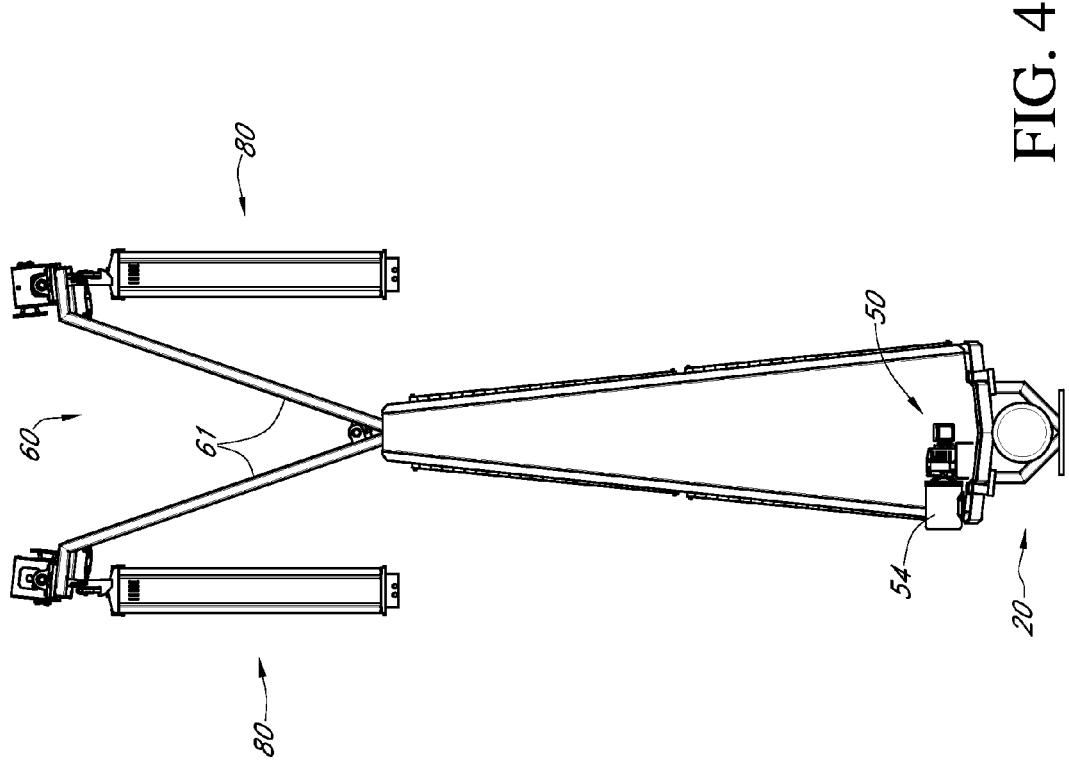
FIG. 4 provides an end view of the growing system shown in FIGS. 1-3.
Figure 5:
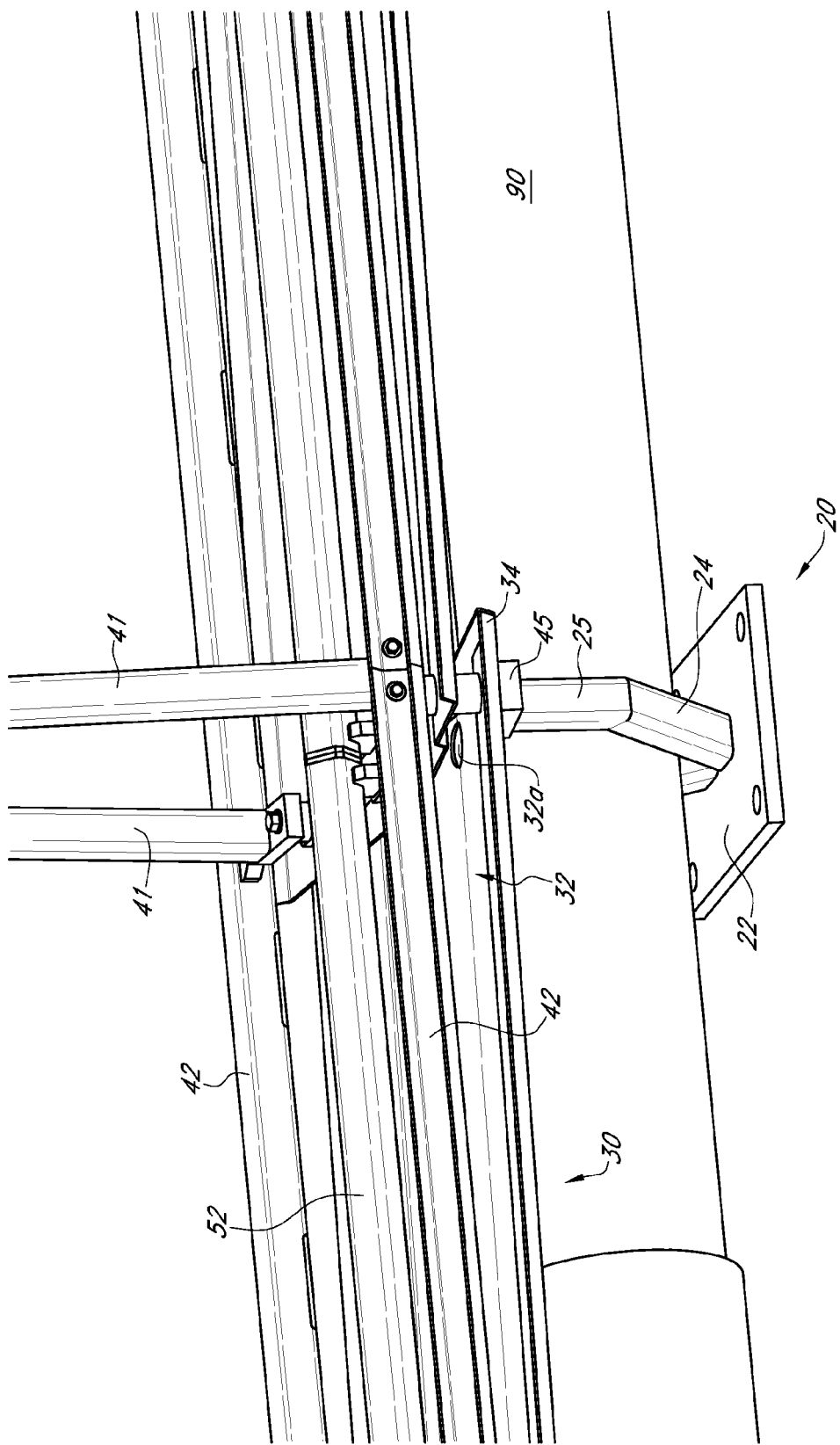
FIG. 5 provides a detailed view of a lower portion of the growing system shown in FIGS. 1-4.

In an aspect of the growing system 10, a light support 60 may be engaged with the board frame 40 adjacent the upper ends of the uprights 41. Generally, the light support 60 may serve to support, move, and/or adjust one or more light systems 80 and/or air conduits 81. Referring specifically to FIGS. 3 and 4, an aspect of a light support system 60 may include one or more extensions 61 extending upward from the board frame 40 at an angle with respect thereto. The distal end of each extension may be configured as a distal tab 61a. A keeper 62 may be engaged with one or more distal tabs 61a along a specific length of the light support 60. In an aspect, a keeper 62 may be configured with a rotational bearing therein, but the scope of the present disclosure is not so limited unless so indicated in the following claims.

A bar 64 may be pivotally engaged with one or more keepers 62 such that the bar 64 may rotate with respect to a keeper 62. A bar 64 may be engaged with a spool 66 such that the spool 66 may rotate with the bar 64. A first end of a connector 68 may be engaged with the spool 66 and a second end thereof may be engaged with a top bar 84 of a light system 80. In an aspect, the connector 68 may be formed as a flexible cable, such that when the bar 64 rotates in a first direction, a portion of the connector 68 wraps around the spool 66 and the light system 80 moves upward with respect to the board frame 40, and when the bar 64 rotates in the opposite direction, a portion of the connector 68 unwraps from the spool 66 and the light system 80 moves downward with respect to the board frame 40. In this manner, the light and/or air flow experienced by plants at different heights on a given plant support structure 14 may be adjustable.

Referring now specifically to FIG. 3, a safety lock 70 may be employed in a growing system 10 having a light system 80 that may move vertically with respect to the board frame 40. An actuator 74 may be engaged with one of the extensions 61 at a first end of the actuator 74, and a second end of the actuator 74 may be engaged with a latch 72 such that the actuator 74 may cause the latch 72 to prevent the light system 80 from moving downward with respect to the board frame 40 through a mechanical engagement between the latch 72 and a portion of the light system 80. It is contemplated that a safety lock 70 may be configured such that the latch 72 prevents downward movement of the light system 70 when one or more persons are positioned under the light system 80, and/or other potentially dangerous situations (e.g., power outages). However, any suitable structure and/or method may be used to prevent unwanted downward movement of the light system 80 with respect to a board frame 40 without limitation unless so indicated in the following claims.

In other aspects of a plant support structure 14 shown in FIGS. 11-17B, the overall height of the plant support structure 14 may be variable and/or modular. As shown, multiple uprights 41 may be engaged with one another on either side of the plant support structure 14 via the top of one upright 41 and an upright base 41a configured adjacent the bottom of another upright 41. Accordingly, multiple uprights 41 may be vertically oriented/engaged with respect to one another.

Figure 11:
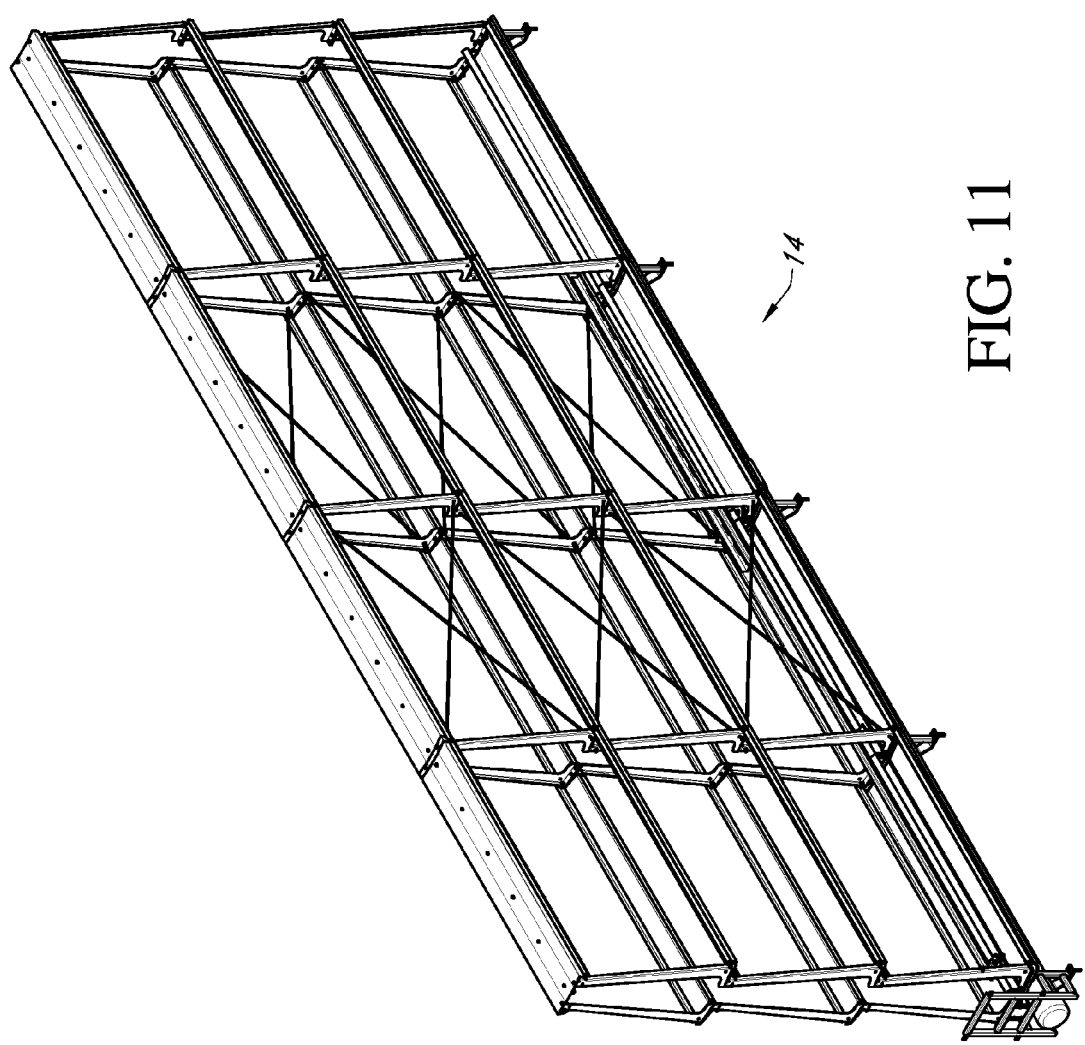
FIG. 11 provides a perspective view of another plant support structure.
Figure 12:
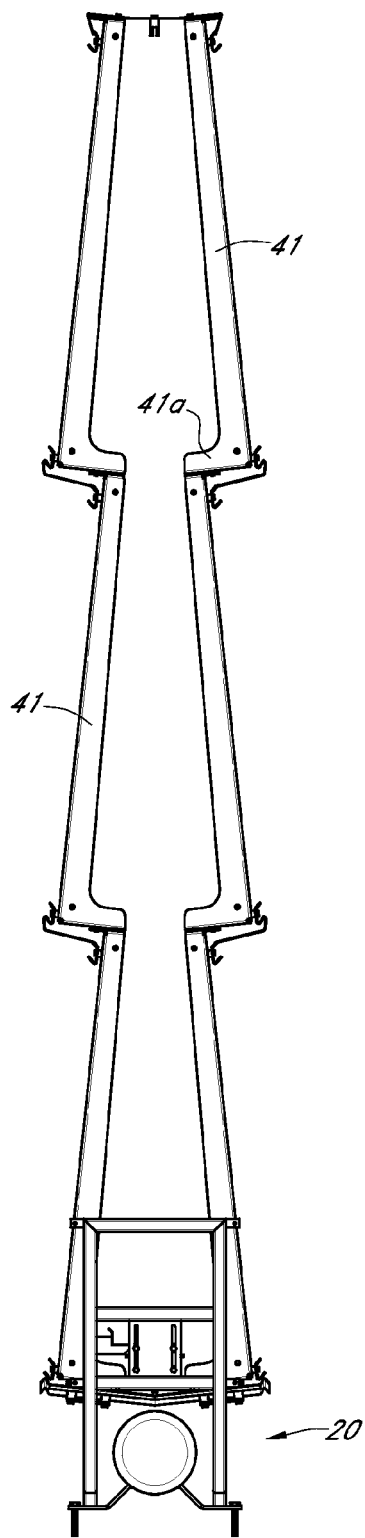
FIG. 12 provides an end view of the plant support structure shown in FIG. 11.
Figure 13:
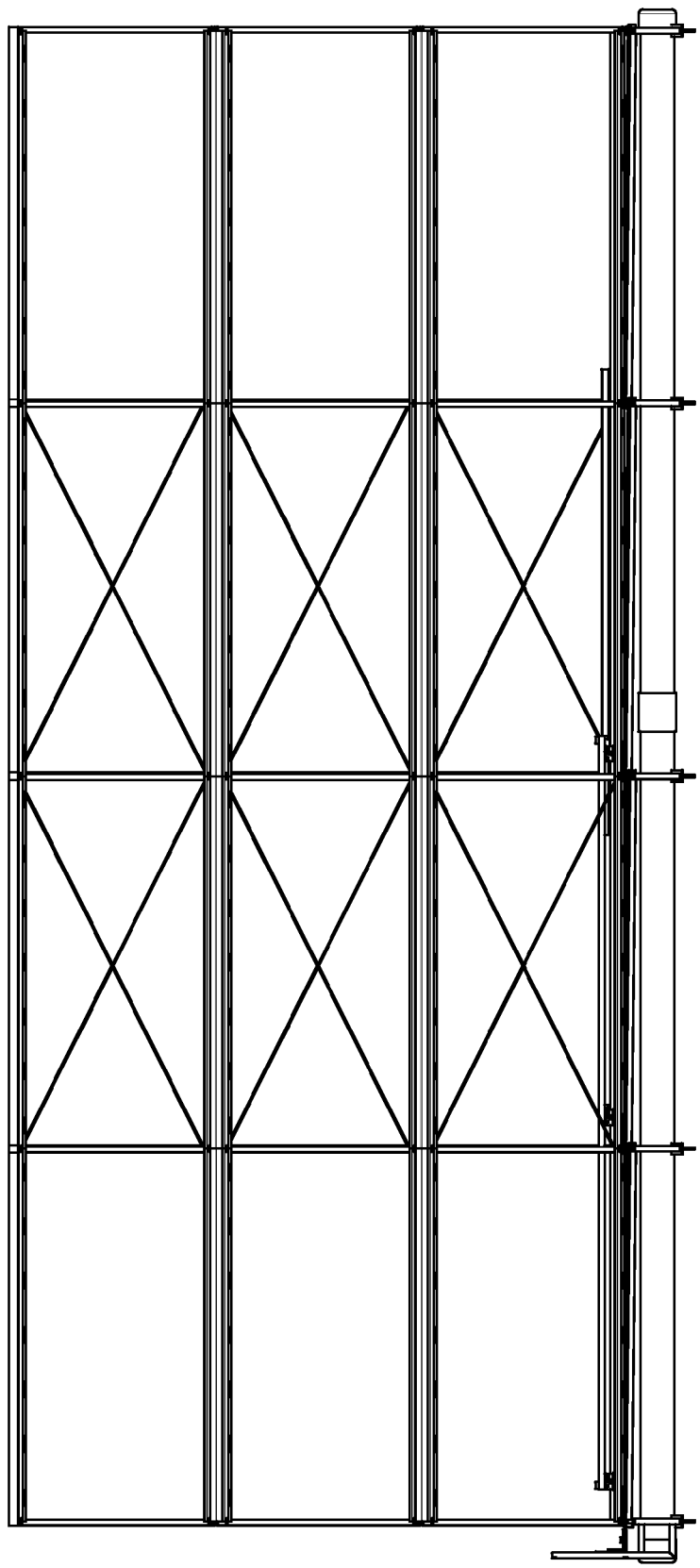
FIG. 13 provides a side view of the plant support structure shown in FIGS. 11 & 12.
Figure 14:
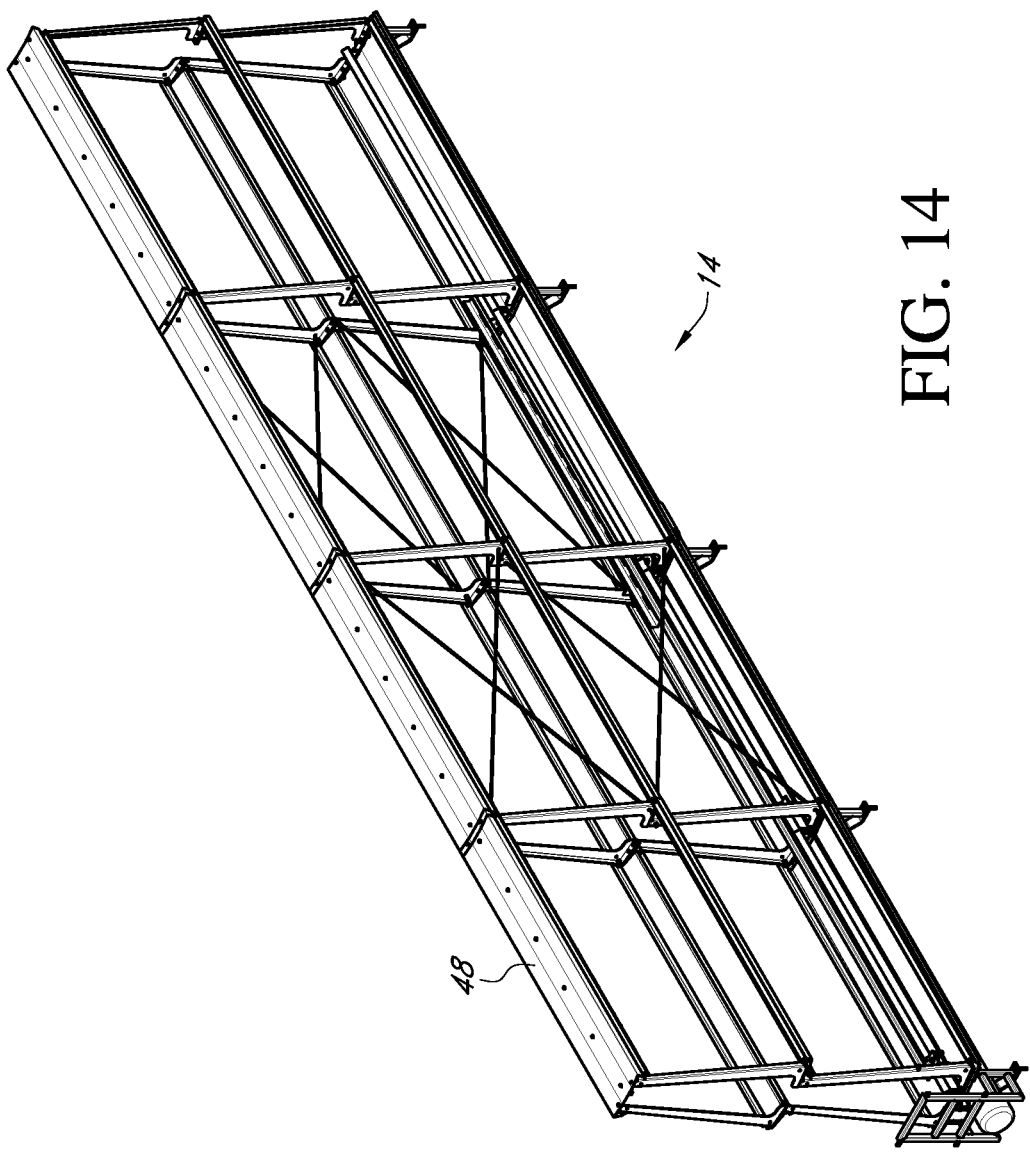
FIG. 14 provides a perspective view of another plant support structure.
Figure 15:
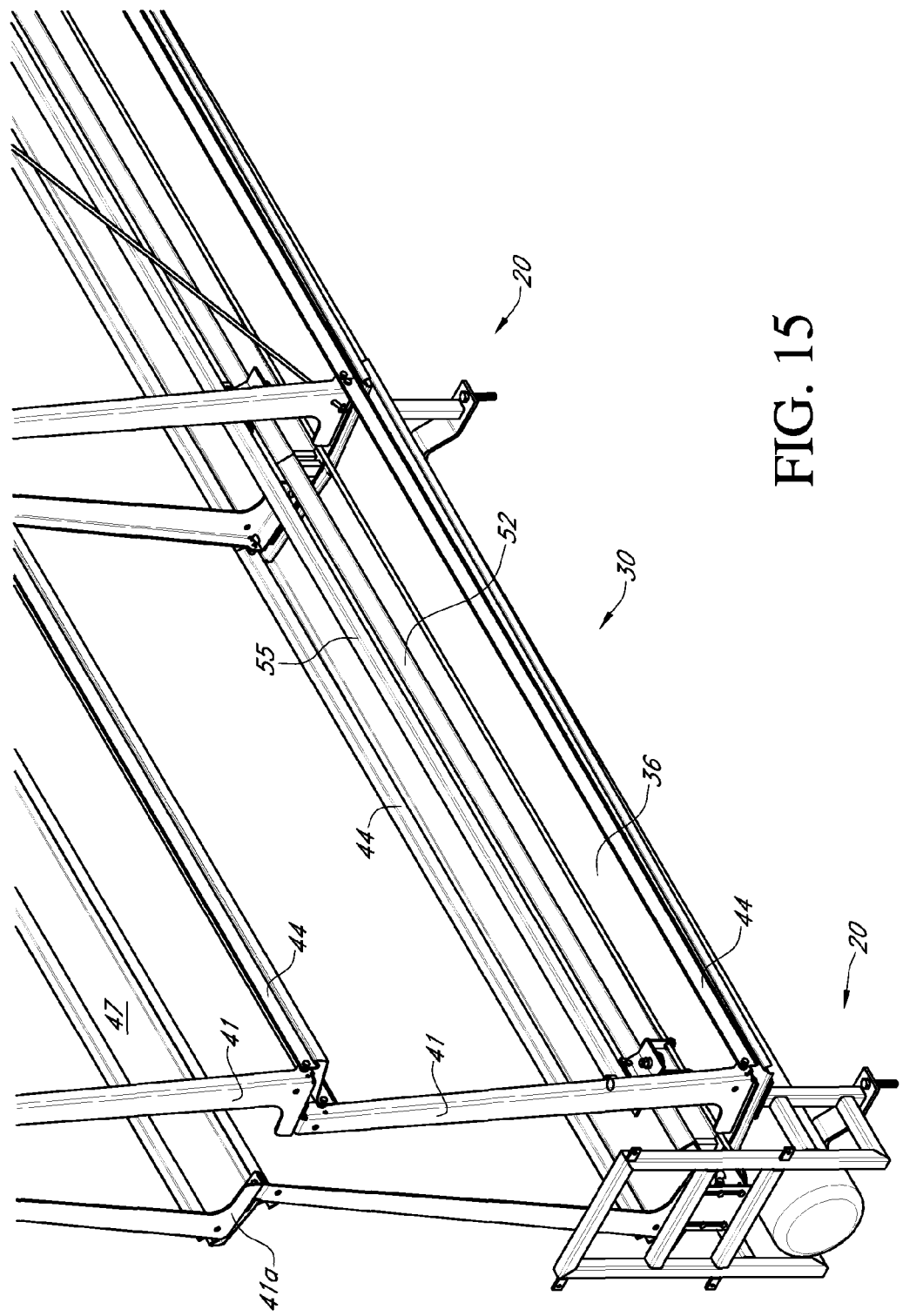
FIG. 15 provides a detailed view of a lower portion of a plant support structure like those shown in FIGS. 11-14.

The specific dimensions and/or configuration of the upright 41 may vary from one embodiment of the plant support structure 14 to the next, but it is contemplated that in some aspects it may be beneficial for the height of an upright 41 to be approximately four feet, such that the plant support structure shown in FIGS. 11-13 may be approximately twelve feet in height, and that shown in FIG. 14 may be approximately eight feet in height. However, in other aspects of the plant support structure 14, the height thereof may be different, greater, or less than those pictured herein without limitation unless so indicated in the following claims. That is, one, two, three, or more uprights 41 may be stacked atop one another without limitation and independent of the height of the individual uprights 41 unless so indicated in the following claims. Additionally, the specific dimensions and/or configuration of the upright base 41 and/or the engagement between the top end of a first upright 41 and the upright base 41a of a second upright 41 positioned above the first upright 41 may vary. For example, in an aspect of the plant support structure 14 the position of the upright base 41 of a first upright 41 positioned on top of a second upright 41 may be moved inward with respect to the second upright 41 so that the distance between corresponding uprights 41 on a higher tier may be less than the distance between corresponding uprights 41 below those on a top tier. Such a configuration may improve light distribution if the growing system 10 is configured for use in a controlled environment utilizing sunlight. However, the scope of the present disclosure is in no way limited by the relative dimensions of any components of the board frame 40 with respect to one another unless so indicated in the following claims.

The plant support structure 14 may include one or more feet 20 adjacent the base thereof along the length of the plant support structure 14 to support various elements of the plant support structure 14. The foot 20 may be configured similarly to that shown in FIGS. 1-10, it may be configured as shown in FIGS. 11, 12, and 14, or it may be differently configured depending on the application of the plant support structure 14. Accordingly, the specific dimensions, shape, orientation, and/or configuration of the structure for supporting a plant support structure 14 in no way limits the scope of the present disclosure unless so indicated in the following claims.

One or more trays 30 as previously described for aspects of the growing system 10 pictured in FIGS. 1-10 may be positioned adjacent the feet 20. The trays 30 may be angled as previously described such that each tray 30 drains into a collection member 90, also as previously described. Alternatively, other structures and/or methods may be used to ensure run-off nutrient supply from the plant root zone is collected with a minimal amount passing from the interior surface of a grow board 12 to the exterior surface thereof without limitation unless so indicated in the following claims. Furthermore, the specific configuration of the tray 30 (e.g., the shape and dimensions of the trough 32, lip 34, side pane 36, etc.) in no way limits the scope of the present disclosure unless so indicated in the following claims.

As previously described for the aspects of a growing system 10 shown in FIGS. 1-10, a nutrient delivery system 50 may be engaged with a portion of the plant support structure 14. In one embodiment, the nutrient delivery system 50 may be configured in a manner similar to that as previously described. In another aspect of a nutrient delivery system 50, the motor 54 may be oriented such that the axis of rotation of the power delivery member of the motor 54 is vertical, which may provide space savings for certain applications of the plant support structure 14.

It is contemplated that an aspect of the growing system may employ a light system 80. Depending on the height of the plant support structure 14, it may be advantageous to configure the light system 80 such that it is moveable in the horizontal dimension. It is contemplated that the light system 80 may move during use such that a light system 80 of a given length may provide light to plants positioned on a plant support structure 14 of a greater length than the light system 80. However, hanging light systems 80 and/or other vertically moving light systems 80 may be used without limitation unless so indicated in the following claims. Additionally, an air conduit 81 and/or an air supply mechanism may be engaged with the light system 80 to provide air circulation and/or high-carbon-dioxide-concentration air to plants. One such aspect of a light system 80 is shown in FIG. 22 and described in further detail below. It is contemplated that a horizontally mobile light system 80 may be positioned between two adjacent plant support structures 14 (and/or growing systems 10) oriented in rows, such that a single light support system 80 may provide light to an exterior side of two adjacent plant support structures 14. One such light system 80 is shown in FIGS. 23A-23C and described in further detail below.

The configuration of the plant support structure 14 may allow for more even light distribution along a specific height of upright 41 than in prior art configurations. For example, if the height of each upright 41 is four feet, and the upright 41 positioned above another upright 41 is the same dimensions and in the same vertically orientded plane, then the only variation of light is along four feet of height even though the plant support structure 14 is eight feet high. In the prior art, an eight-foot-high plant support structure 14 would have incurred light variation along its entire height. Accordingly, an aspect of a growing system 10 shown in FIGS. 11-17B may allow for more even light distribution, and therefore more even plant growth when compared to prior art plant support structures 14. Additionally, the light system 80 may be configured to mimic the shape of the plant support structure 14 along its length. That is, the light system 80 may be configured such that certain light sources are horizontally misaligned from other light sources such that each light source in a given light system 80 is approximately the same distance from an upright 41 along the height of the upright 41. As shown in FIG. 12, this may require angling portions of the light system 80 at angles equal or nearly equal to the angle of each upright 41.

Figure 16:
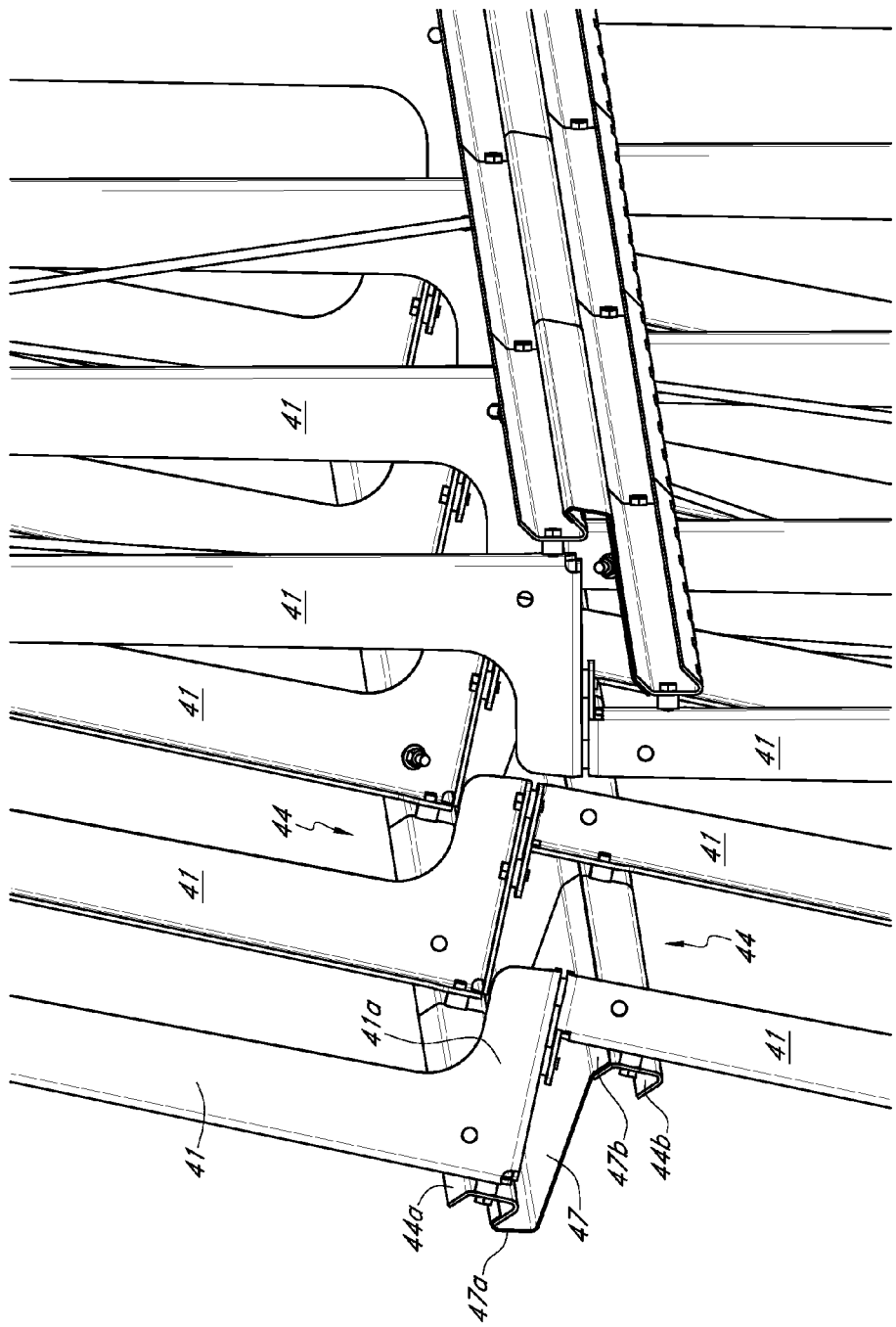
FIG. 16 provides a detailed view of a portion of a plant support structure like those shown in FIGS. 11-15.
Figure 17A:
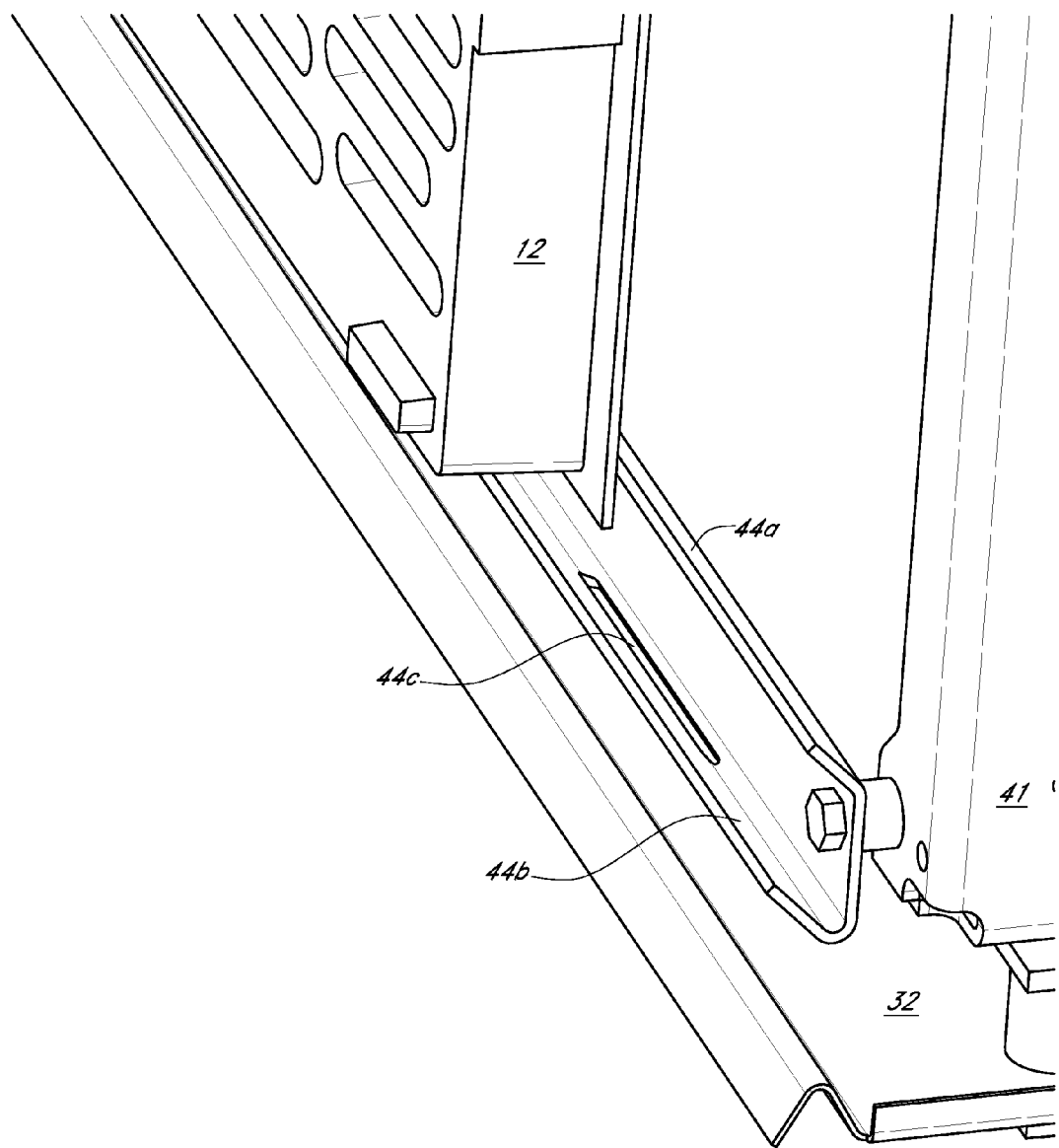
FIG. 17A provides a detailed view of a grow board engaged with a rail adjacent a bottom edge of the grow board.
Figure 17B:
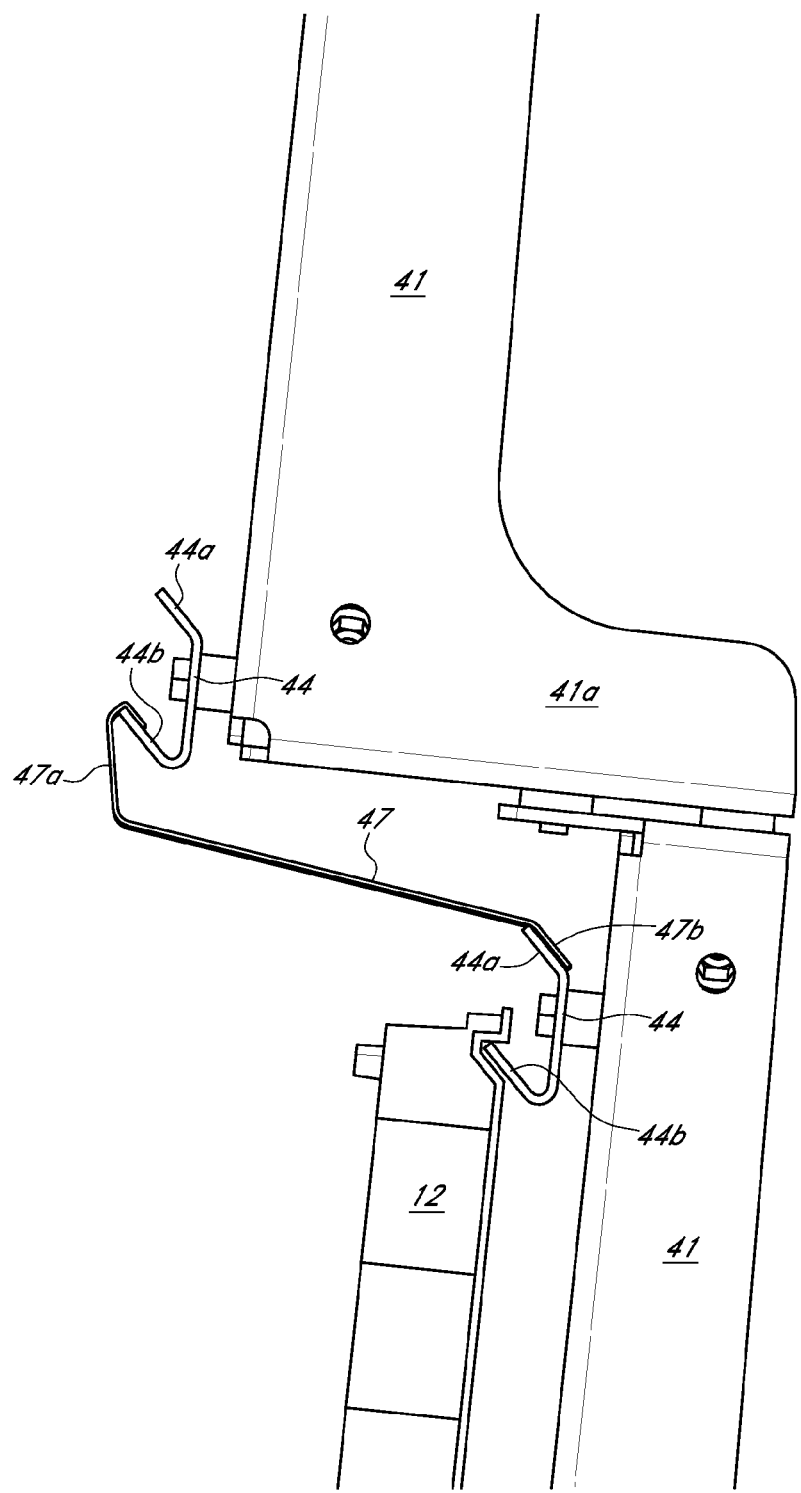
FIG. 17B provides a detailed view of a grow board engaged with a rail adjacent a top edge of the grow board.
Figure 17C:
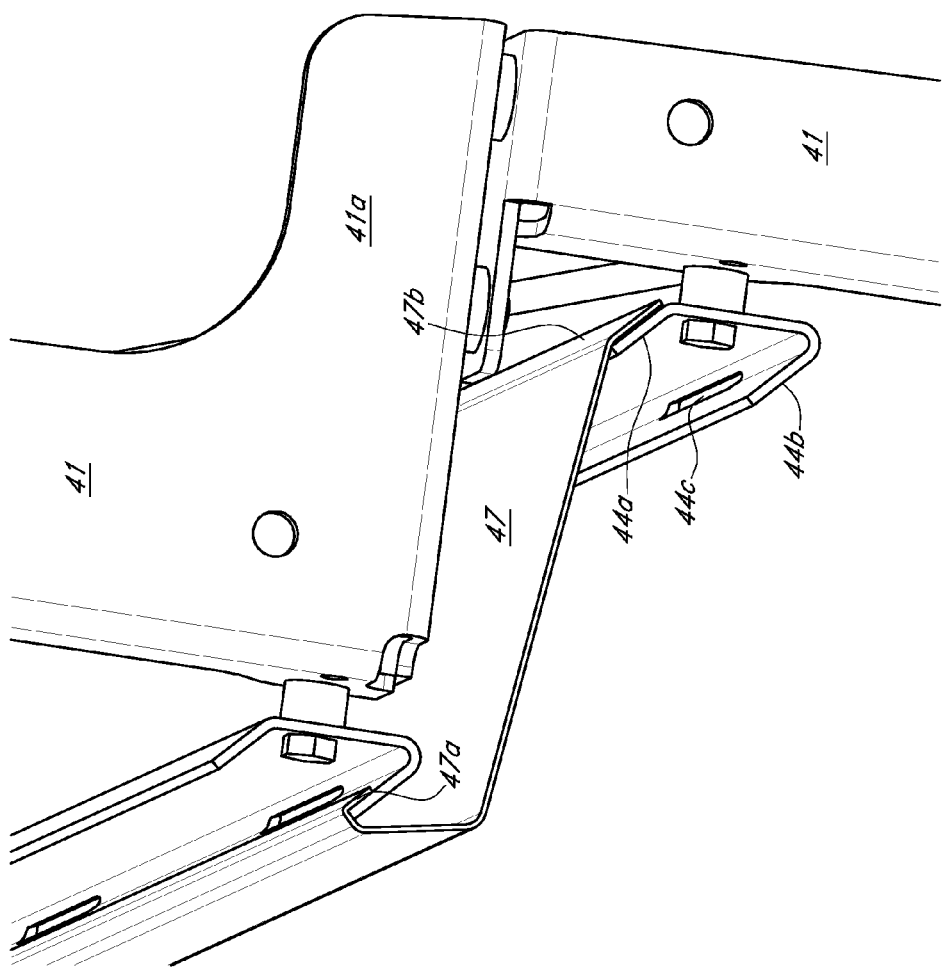
FIG. 17C provides a detailed view of a pan and two adjacent intermediate rails.

As shown in FIGS. 16 and 17B, a pan 47 may be engaged with two intermediate rails 44 on adjacent uprights 41, wherein a first upright 41 is positioned above a second upright 41. The intermediate rail 44 on the first upright 41 may be positioned adjacent the bottom thereof (e.g., by the upright base 41a). The intermediate rail 44 on the second upright 41 may be positioned adjacent the top thereof. Accordingly, the intermediate rails 44 may be both vertically and horizontally displaced from one another. The intermediate rails 44 may be configured with an upper lip 44a and a lower lip 44b to prevent and/or mitigate egress of nutrient supply from an area on the interior side of a grow board 12 to an area on the exterior side thereof. However, the intermediate rails may be differently configured without limitation unless so indicated in the following claims.

Referring specifically to FIG. 17B, an aspect of the pan 47 may include a pan top lip 47a that may be configured to engage and exterior surface of the lower lip 44b of the intermediate rail 44 positioned adjacent the bottom of the first upright 41. The pan 47 may also include a pan bottom lip 47b that may be configured to engage an interior surface of the upper lip 44a of the intermediate rail 44 positioned adjacent the top of the second upright 41. Such a configuration prevents all or nearly all nutrient supply from leaking out of the interior chamber of the plant support structure 14 (i.e., from an area on the interior surface of a grow board 12 to an area on the exterior side thereof).

Each intermediate rail 44 may be formed with one or more drains 44c along its length, which drains 44c may be positioned adjacent the proximal end of each lower lip 44b. This configuration, in combination with the pan 47, ensures that nutrient supply that may be positioned in an intermediate rail 44 above another grow board 12 can easily pass through the drains 44c in that intermediate rail 44 and down the pan 47 and over the pan bottom lip 47b and eventually to the tray 30 without passing from the interior chamber of the plant support structure 14 to the exterior thereof, and without contacting any plants other than those for which the nutrient supply was intended. Other configurations for intermediate rails 44 and/or pans 47 may be used to mitigate nutrient supply moving from the interior of the plant support structure 14 to the exterior thereof, and/or to prevent overexposure to nutrient supply may be used without limitation unless so indicated in the following claims. Additionally, any structure and/or method designed to mitigate nutrient supply moving from the interior of the plant support structure 14 to the exterior thereof, and/or to prevent over exposure to nutrient supply may be used without limitation unless so indicated in the following claims.

As shown, the grow board 12 may be engaged with the bottom lip 44b of an intermediate rail 44, such that the weight of the grow board 12 may be largely supported by the intermediate rail 44. With reference to FIG. 17B, a catch (not shown) may be molded into the top edge of the grow board 12 adjacent the channel shown engaged with the bottom lip 44b to prevent unwanted disengagement between the grow board 12 and the intermediate rail 44. Additionally, the lateral edges of the grow board 12 may be configured to overlap and/or mate with adjacent grow boards 12 (e.g., in a shingling fashion, male-to-female fit, tongue and groove, etc.) such that the likelihood of nutrient supply passing from the interior of the plant support structure 14 to the exterior between the side edges of adjacent grow boards 12 is mitigated and/or eliminated.

Figure 18:
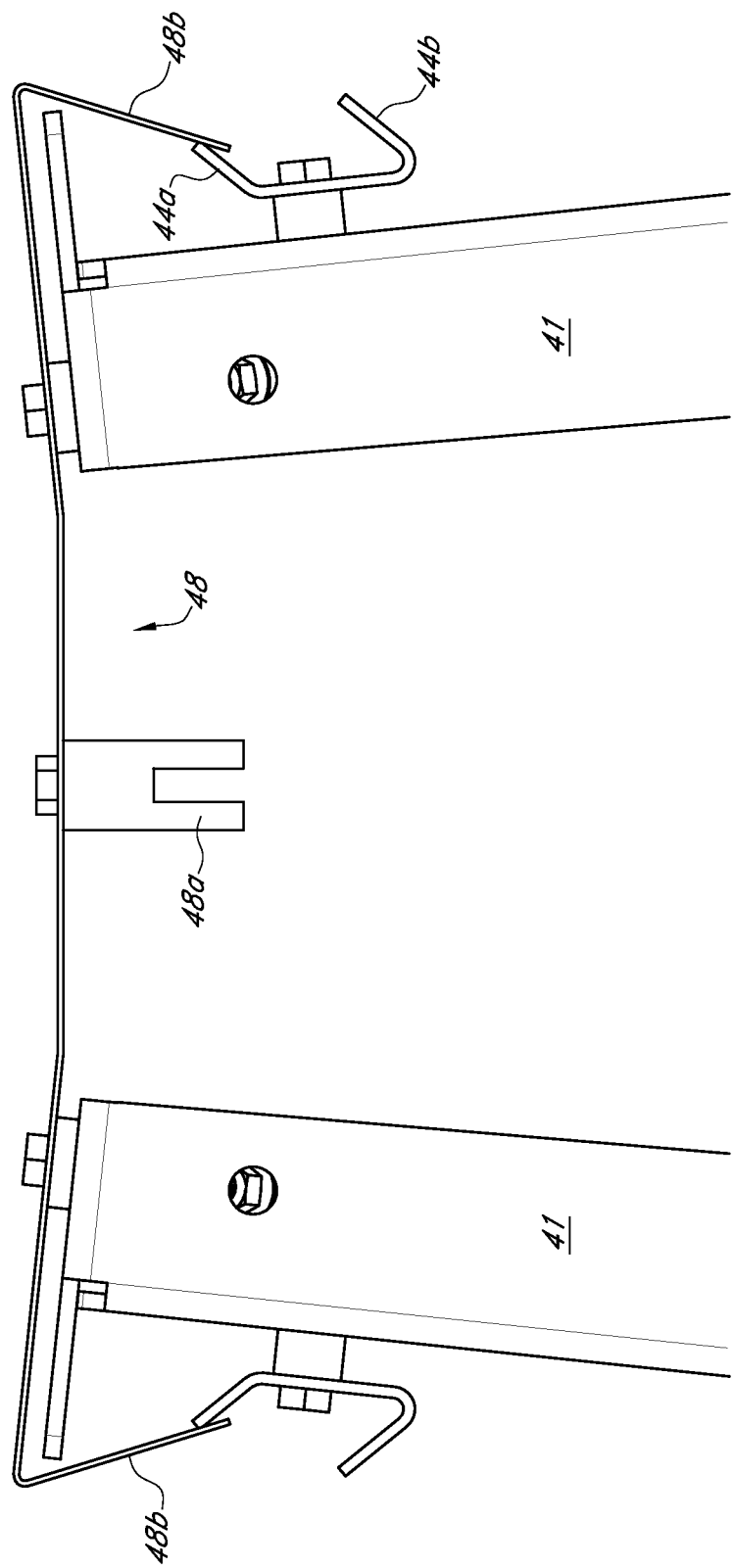
FIG. 18 provides a detailed view of various aspects of a board frame adjacent the top end thereof.

A detailed end view of various aspects of a board frame 40 near the cap 48 is shown in FIG. 18. Generally, the cap 48 may be configured to engage the top portions of two adjacent uprights 41 to as to prevent or mitigate the egress of nutrient supply from the interior of the plant support structure 14 to the exterior thereof. The cap 48 may comprise one or more wings 48b, which may be configured to extend downward past the top portion of an upright 41 and engage the upper lip 44a of the uppermost intermediate rail 44. The wing 48b may engage the upper lip 44a on the exterior surface thereof, or in another aspect the wing 48b may be configured to engage the upper lip 44a on an interior surface thereof.

In certain aspects of a nutrient delivery system 50, the nutrient delivery system 50 may include one or more masts 53 (shown for the nutrient delivery system 50 pictured in FIG. 23A) extending upward from one or more base members 56. One or more nozzles and/or nutrient supply outlets 53a may be positioned along the length of the mast 53. Depending on the height of a mast 53, it may be desirable to mitigate unwanted bending and/or other movement of the mast 53 at a topmost, distal end of the mast 53. In such circumstances, the cap 48 may comprise a guide 48a on an interior surface of the cap 48. The guide 48a may be configured such that the topmost, distal end of a mast 53 may slideably engage a slot formed in the guide 48a. In an aspect, the guide 48a may mitigate and/or prevent unwanted movement of the mast 53 with respect to the board frame 40 in a first direction (e.g., a direction parallel to the width of a board frame 40) and allow movement of the mast 53 with respect to the board frame 40 in a second direction (e.g., in a direction parallel to the length of a board frame 40).

Figure 20A:
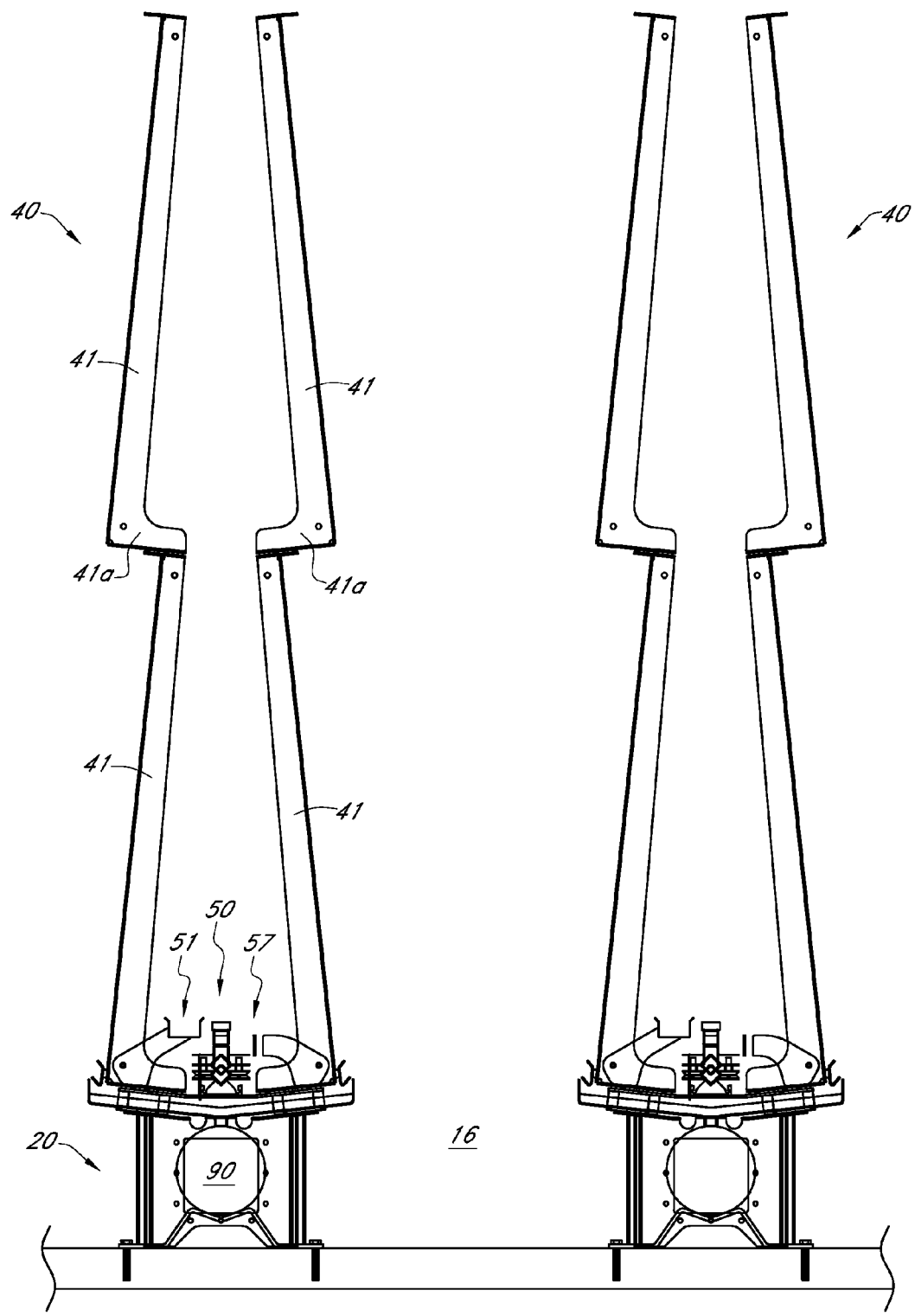
FIG. 20A provides an end view of two growing system positioned adjacent one another.
Figures 20B, 20C, 20D:
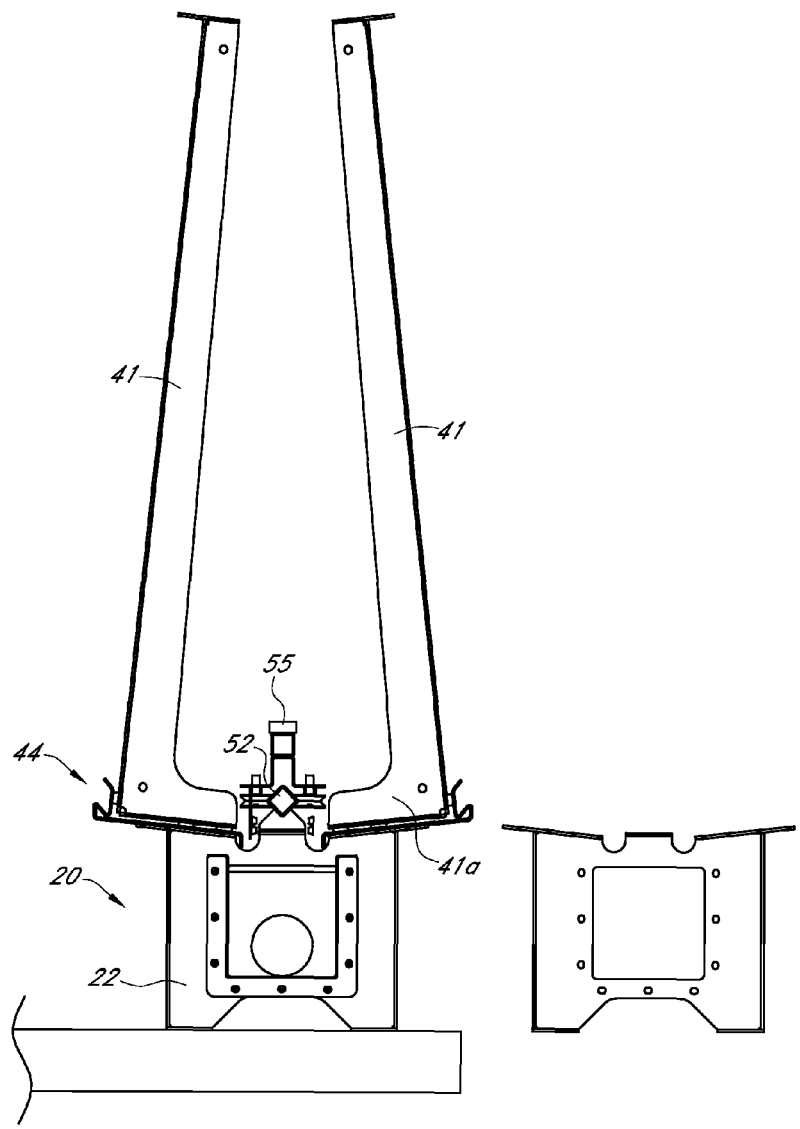
FIG. 20B provides a detailed end view of a growing system adjacent a foot of the growing system.
FIG. 20C provides a detailed view of a portion of the foot shown in FIG. 20B FIG. 20D provides a detailed view of another portion of the foot shown in FIGS. 20B & 20C.

An end view of two plant support structures 14 (and/or growing systems 10) positioned adjacent one another to form rows is shown in FIG. 20A. It is contemplated that such an arrangement may be an efficient use of floor space in a building (e.g., warehouse, greenhouse, etc.). This arrangement may allow for access between adjacent plant support structures 14 (via an aisle 16 formed between the adjacent plant support structures 14) for various tasks, including but not limited to positioning grow boards 12 on the plant support and/or removal of same, maintenance, providing light to plants, harvesting plants, and/or providing air circulation to plants. In an aspect, the top ends of adjacent uprights 41 between rows may be spaced from one another by approximately 33 inches, but in other aspects the top ends of adjacent uprights 41 may be spaced from one another by greater than 34 inches and in still other aspects the top ends of adjacent uprights 41 may be spaced from one another by less than 33 inches without limitation unless so indicated in the following claims.

Other aspects of a foot 20 and collection member 90 are shown in FIGS. 20B-20E. It is contemplated that feet 20 so configured may be positioned along the length of a plant support structure 14 in a manner similar to that shown in FIGS. 2, 6, 7, 11, 13, & 14. However, other spacing and/or configurations of feet 20 may be used without limitation unless so indicated in the following claims. The foot 20 may be formed with a base 22 having a an exterior surface that is substantially planar, and one or more feet 20 and/or bases 22 thereof may be mechanically engaged with one another via one or more lateral members 28, which is clearly shown at least in FIG. 20E. The lateral members 28 may be engaged with a foot 20 and/or base 22 via any suitable structure and/or method, including but not limited to mechanical fasteners, chemical adhesives, welding, and/or combinations thereof without limitation unless so indicated in the following claims.

One or more tabs 21 may be angled with respect to a planar exterior surface of the foot 20. The tabs 21 may be configured such that one or more upright bases 41a may be engaged with the foot 20 at a tab 21. The tabs 21 may also be configured such that one or more trays 30 may be engaged with the foot 20 at the tabs 21. Additionally, one or more tabs 21 may be configured such that a portion of the nutrient delivery system 50 (e.g., a channel 52 and/or a guide 52, etc.) may be engaged with one or more feet 20 via one or more tabs 21. The engagement between a foot 20 and upright 40, between a foot 20 and a tray 30, and/or between a foot 20 and/or a portion of the nutrient delivery system 50 may be via any suitable structure and/or method, including but not limited to mechanical fasteners, chemical adhesives, welding, and/or combinations thereof without limitation unless so indicated in the following claims. It an aspect, the foot 20 and/or base 22 may be integrally formed with the tabs 21, and the foot 20 and/or base 22 may be cut from a plate of material (e.g., a metallic sheet) after which the tabs 21 may be bent with respect to a planar exterior surface of the foot 20 and/or base 22. However, the scope of the present disclosure is in no way limited by the specific fabrication method used for the foot 20 and/or any other components of the plant support structure 14 and/or grow board 12 unless so indicated in the following claims.

Figure 20E:
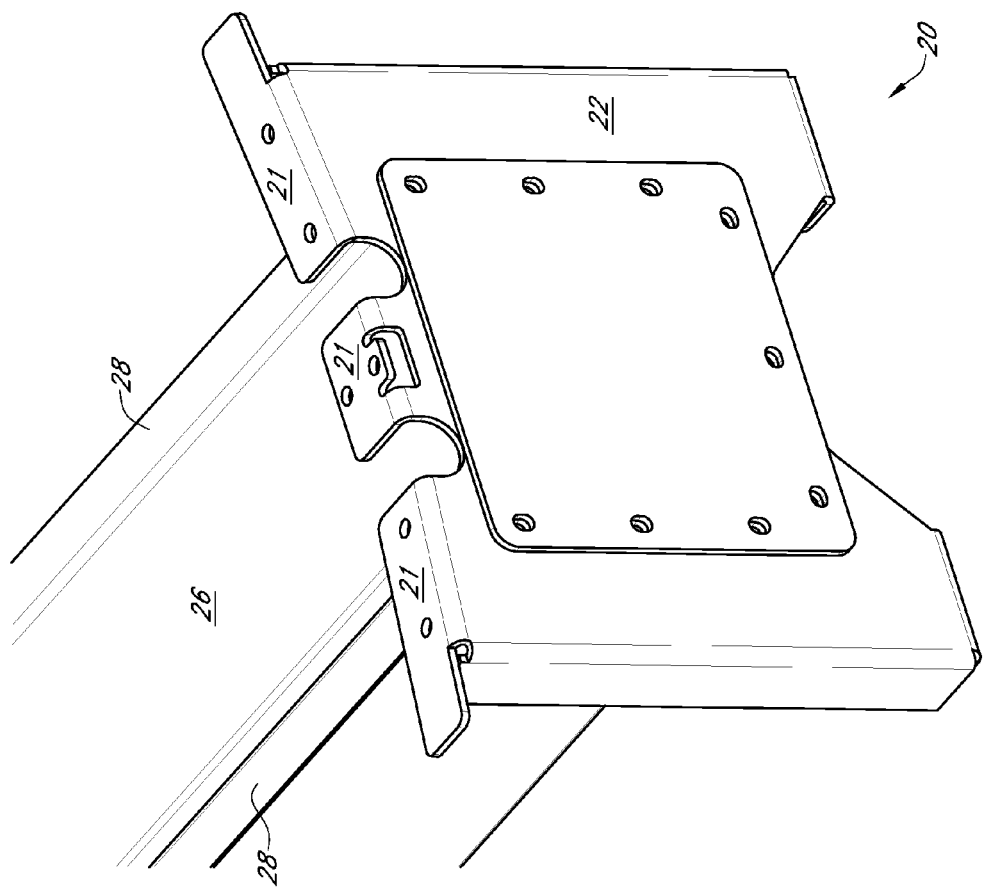
FIG. 20E provides a detailed perspective view of the foot shown in FIGS. 20B-20D.

Still referring to FIG. 20E, a gutter 26 may be positioned between adjacent lateral members 28. The gutter 26 may be engaged with a first foot 20 at one end of the gutter 28 and with a second foot 20 at another end of the gutter 28. In an aspect of a gutter 28, the gutter 28 may function as a type of collection member 90 for nutrient supply as previously described herein. That is, nutrient supply that runs off the roots of plants positioned on the plant support structure 14 may drain from trays 30 into a gutter 28, from where the nutrient supply may be cleaned and/or otherwise treated and recycled to the nutrient delivery system 50. Additionally, the gutter 26 may be configured to allow a portion of a nutrient delivery system 50 to be positioned therein, which may eliminate the need for a guide 52 and/or other components of the nutrient delivery system 50. In such an aspect, one or more base members 56 may be configured with wheels thereon such that the base members 56 may move along the length of the gutter 26. One or more masts 53 may be engaged with each base member 56 as in other aspects of a growing system previously described herein.

Figure 21A:
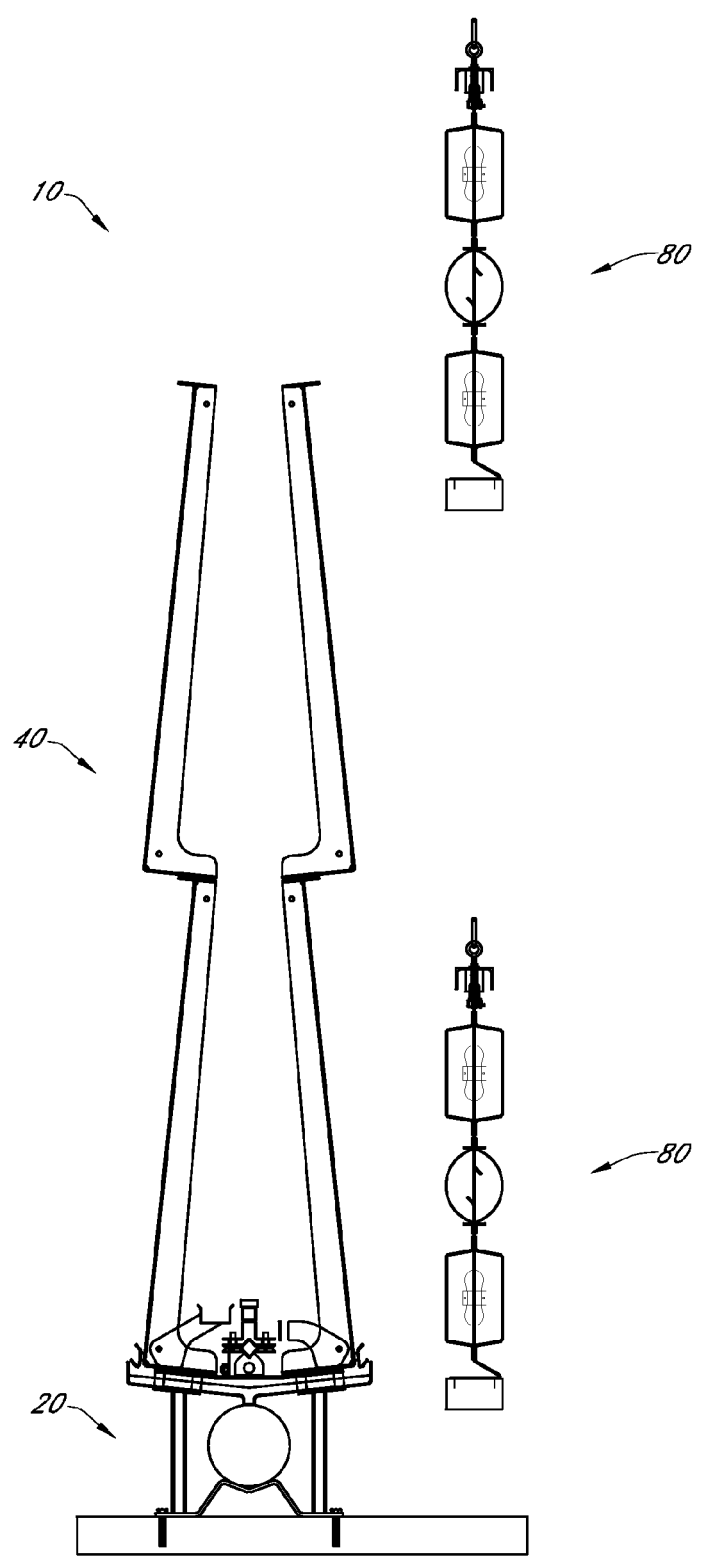
FIG. 21A provides an end view of a growing system with a light system positioned adjacent a plant support structure.

An end view of a growing system 10 with a vertically moveable light system 80 is shown in FIG. 21A, and FIG. 21B provides a detailed view of a portion of the growing system 10 adjacent the interface of a foot 20 and board frame 40. Referring specifically to FIG. 21A, the light system 80 is shown in an aspect of an uppermost position of the light system 80 and a lowermost position thereof. It is contemplated that moving the light system 80 to the uppermost position may provide access to aisles 16. The position of the light system 80 may be adjusted via any suitable method and/or structure without limitation unless so indicated in the following claims. In an aspect, the light system 80 may be suspended from the ceiling of a structure via one or more cables that may be connected to a rotatable rod for lowering and/or raising the light system 80. However, the scope of the present disclosure is not limited by the specific structure and/or method for moving the light system 80 unless so indicated in the following claims.

Referring now to FIG. 21B, which provides a detailed view of a portion of a growing system 10 adjacent an interface between a foot 20 and a board frame 40, a channel 51 and one or more sensors 57 may be engaged with one or more feet 20. It is contemplated that the channel 51 may be configured to support and/or otherwise engage a fluid conduit (not shown) used to provide nutrient supply to the root zone of plants positioned on the plant support structure 14 and/or other conduit required for a nutrient delivery system 50 (including but not limited to electrical wiring and/or components). Such a channel 51 may be especially useful in aspects of a nutrient delivery system 50 operating in a reciprocating and/or otherwise moveable manner. Additionally, one or more sensors 57 may be especially useful in a nutrient delivery system 50 so configured as a sensor 57 may be configured to cause a motor engaged with a portion of the nutrient delivery system 50 to reverse and/or otherwise control an aspect of the nutrient delivery system 50 and/or affect the operation thereof. Redundant sensors 57 may be positioned adjacent one another in the event of failure.

A guide 52 may be configured to have a square cross-sectional shape and may be angled as shown in FIG. 21B. In an aspect, the nutrient delivery system 50 may be configured such that one or more wheels may engage the vertices of the guide 52 oriented at the sides thereof. A coupler 55 may extend along a portion of the length of a plant support structure 14 to mechanically engage one base 56 with another base 56 as previously described for other plant support structures 14.

Figure 22A:
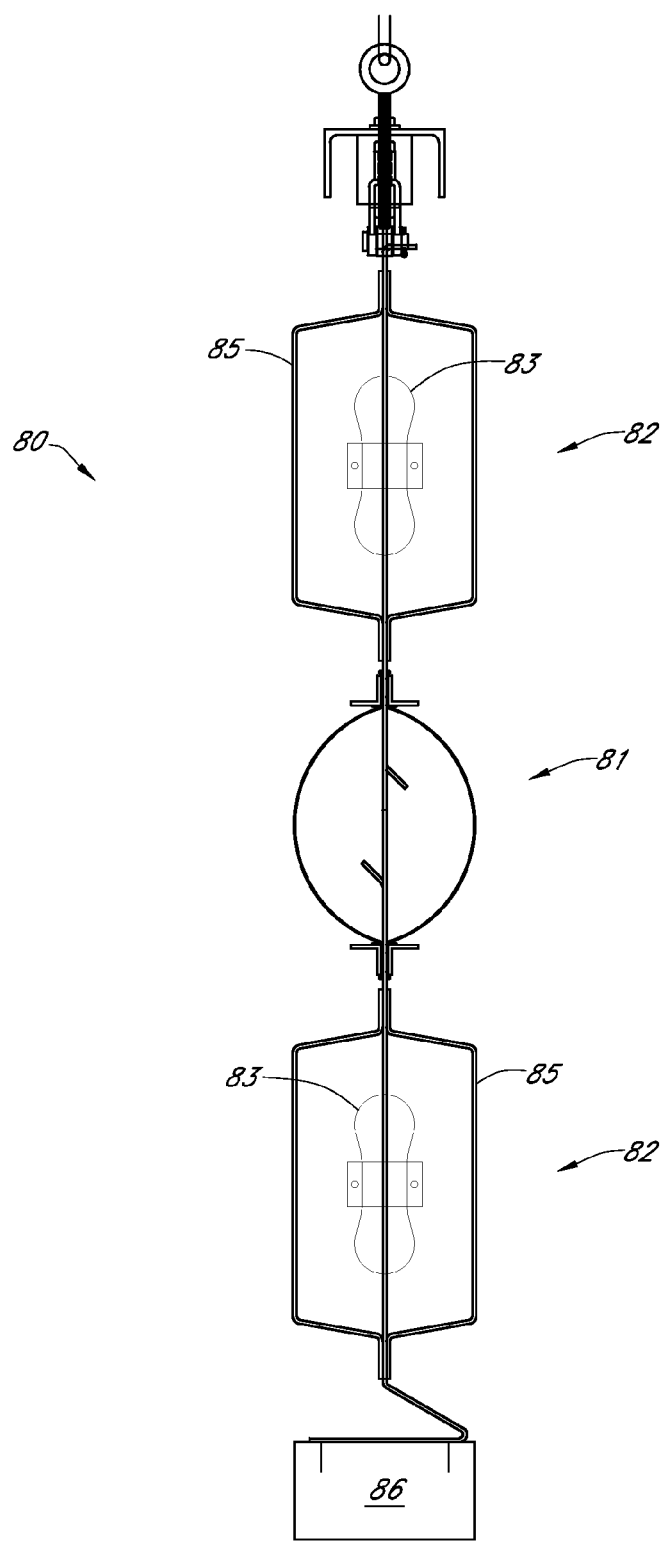
FIG. 22A provides an end view of the light system shown in FIG. 21A.
Figure 22B:
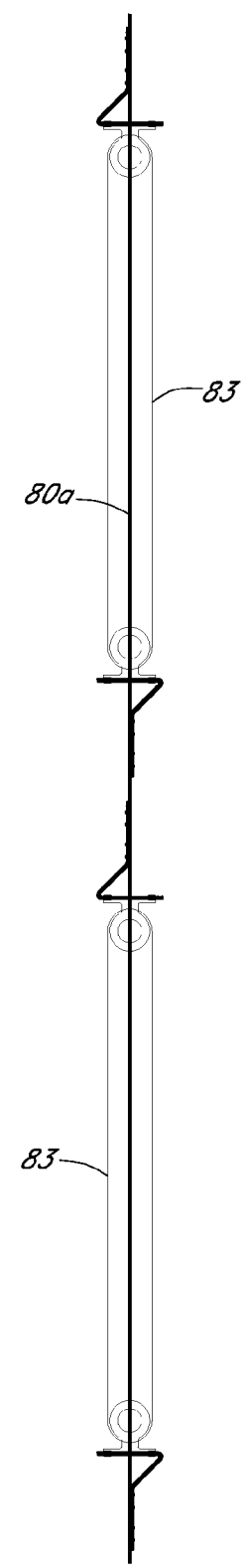
FIG. 22B provides a top view of a portion of the light system shown in FIG. 22A.
Figure 22C:
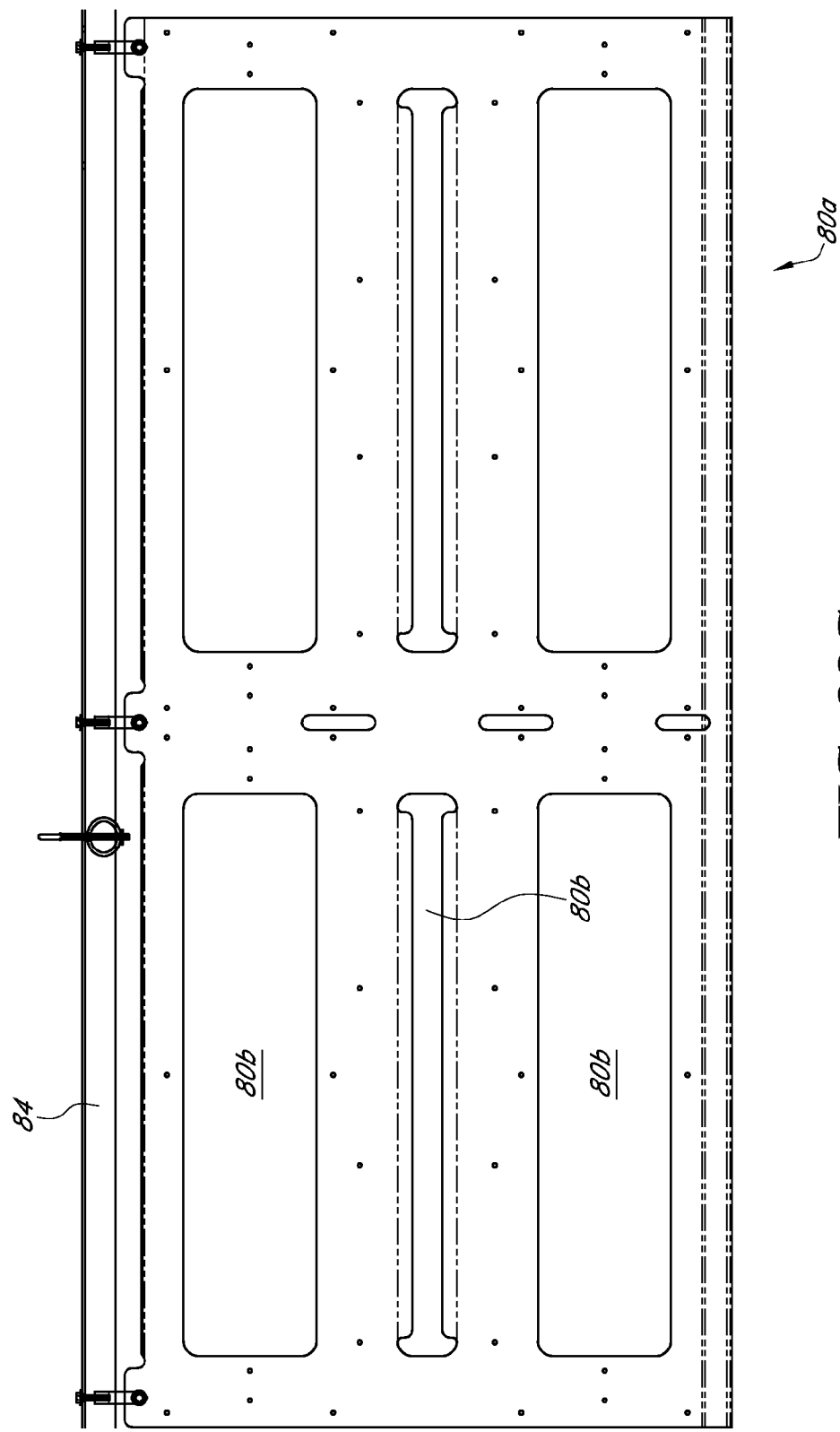
FIG. 22C provides a side view of a portion of the light system shown in FIGS. 22A & 22B.
Figure 22D:
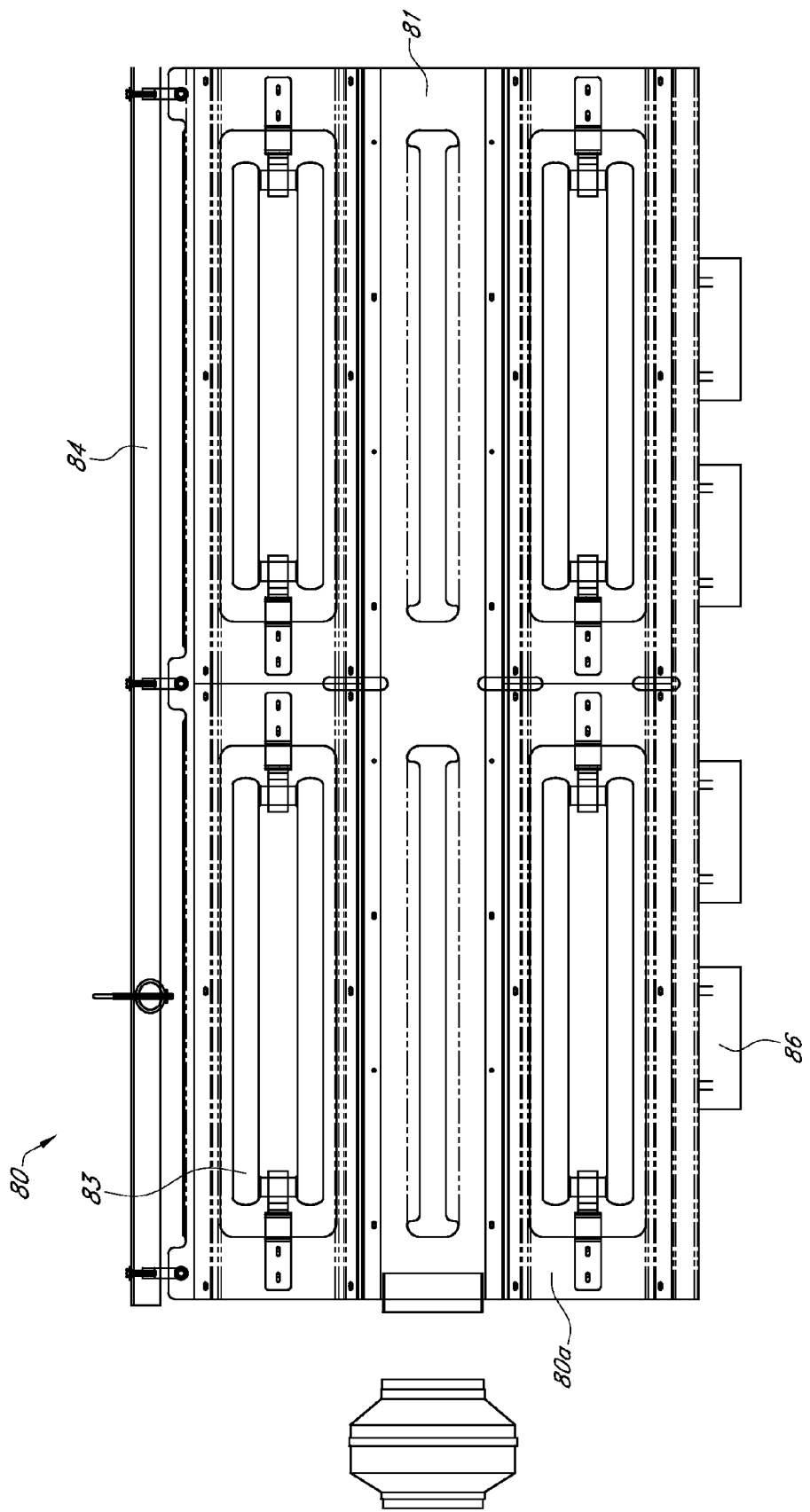
FIG. 22D provides another side view of a portion of the light system shown in FIGS. 22A-22C.
Figure 23B:
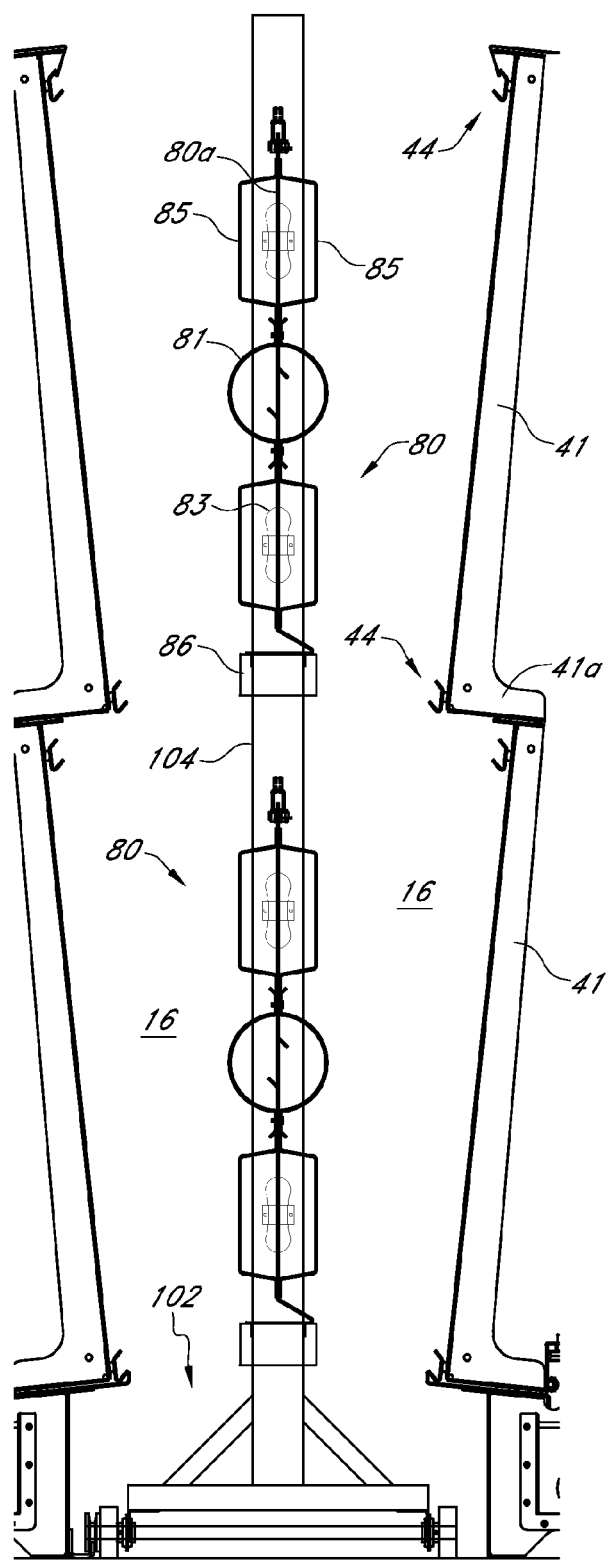
FIG. 23B provides a detailed view of one aisle and light system from FIG. 23A.
Figure 23C:
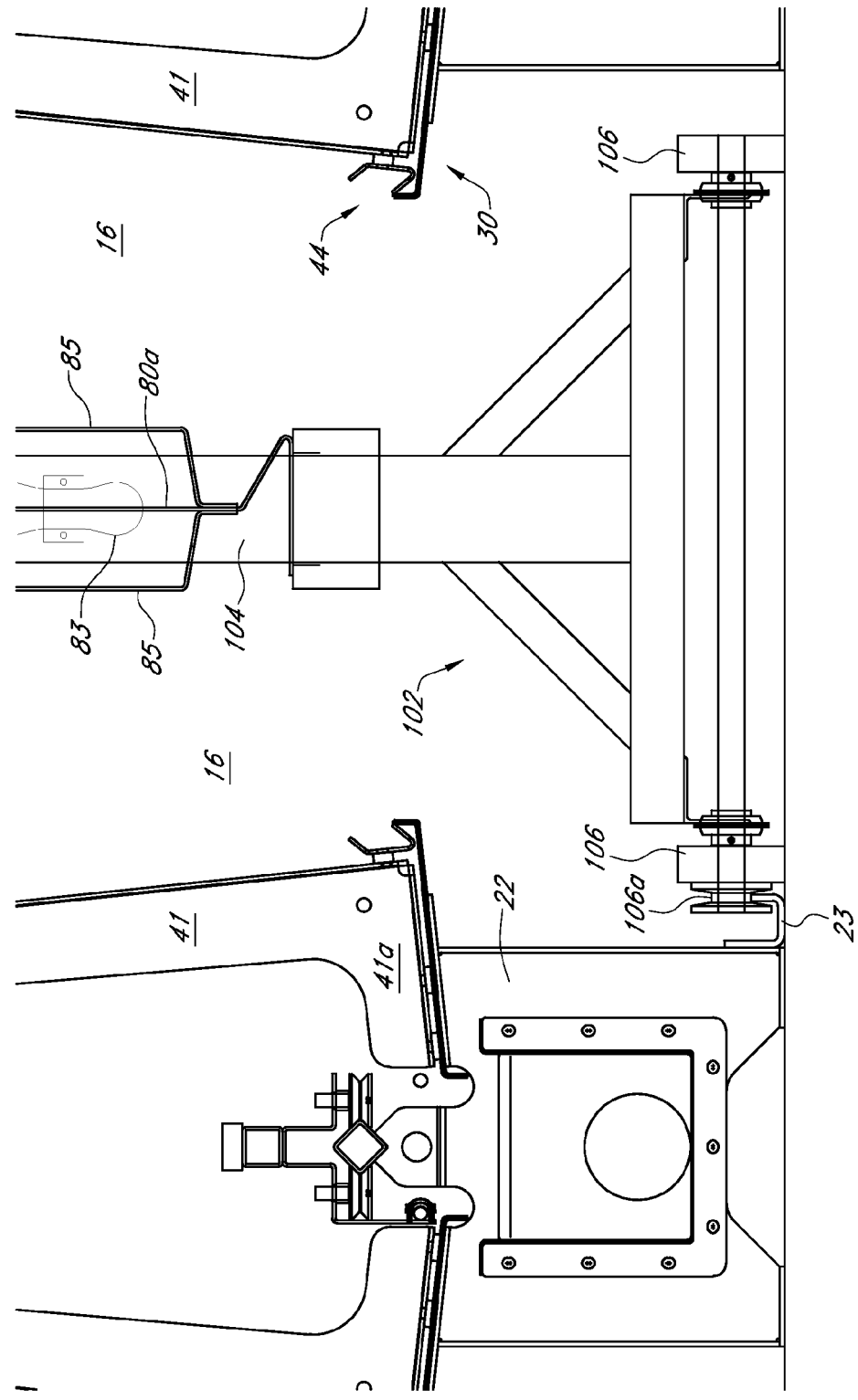
FIG. 23C provides a detailed view of a bottom portion of the aisle and light system from FIGS. 23A & 23B.

A cross-sectional end view of a light system 80 employing an integrated air conduit 81 is shown in FIG. 22A and a side view thereof is shown in FIG. 22D. The air conduit 81 may be in fluid communication with a supply source (not shown) for air, carbon dioxide, and/or air having a relatively high concentration of carbon dioxide. It is contemplated that in an aspect such a supply source may be configured as an HVAC system, wherein various characteristics (including but not limited to temperature, pressure, humidity, etc.) of the air supply may be controlled. In an aspect, the light system 80 may be configured such that the air conduit 81 is flanked on the top and bottom thereof by a top panel 82 and a bottom panel 82. However, other configurations may be used in accordance with the present disclosure without limitation unless so indicated in the following claims. For example, in an aspect of a light system 80 employing one or more LED and/or metal halide light sources 83, the air conduit 81 may positioned along one or more borders of a panel 82. Each panel 82 may be configured with at least one light source 83, which light source 83 may partially or fully enclosed in a light cover 85. Electronics 86 in electrical communication with one or more light sources 83 may be positioned at the bottom of the light system 80. However, the position of the electronics 86 in communication with one or more light sources 83 in no way limits the scope of the present disclosure unless so indicated in the following claims.

A top view of the light system 80 from FIG. 22A is provided in FIG. 22B, wherein the light covers 85 and air conduit 81 have been removed for clarity. As shown, one or more light sources 83 may be engaged with a support frame 80a. A side view of the support frame 80a from the light system 80 shown in FIGS. 22A & 22B is shown in FIG. 22C. The support frame 80a may be configured with one or more voids 80b therein to accommodate one or more light sources 83 and/or to accommodate an air conduit 81 and/or portion thereof. The support frame 80a may be engaged with a top bar 84.

It is contemplated that a light system 80 configured such as that shown in FIGS. 22A-22D may provide light and increased air and/or carbon dioxide flow to plants positioned adjacent the light system 80. An air and/or carbon dioxide source may be fluidly engaged with the air conduit 81 such that air and/or carbon dioxide flow exits the air conduit 81 in a direction toward one or more plants positioned adjacent the light system 80 via one or more apertures formed in the air conduit 81. The optimal air and/or carbon dioxide flow characteristics (e.g., pressure, velocity, volumetric flow rate, etc.) will vary at least depending on the type of plant, and are therefore in no way limiting to the scope of the present disclosure unless so indicated in the following claims. A light system 80 so configured may be moved vertically at various intervals and/or at various times to provide equal average light and air and/or carbon dioxide flow to plants at various heights in a manner illustrated by the configuration of a plant support structure 14 and light system 80 shown in FIG. 21A.

An end view of three plant support structures 14 arranged in three rows and three light systems 80 positioned adjacent the three plant support structures 14 (two of which light systems 80 are positioned in two corresponding aisles 16) is shown in FIG. 23A. In an aspect of the growing system 10 shown in FIGS. 23A-23C, the light system 80 may be configured to move horizontally with respect to one or more plant support structures 14 within an aisle 16. Such a configuration may be especially useful in growing systems 10 having plant support structures 14 configured to have a relatively large height (e.g., including but not limited to plant support structures 14 having more than two tiers of uprights 41).

The light system 80 may be engaged with a trolley 100, wherein the trolley may comprise a trolley upright 104 and a trolley base 102, which trolley is greater detail in FIGS. 23B & 23C. The trolley upright 104 may extend upward from the trolley base 102. The trolley base 102 may be configured to move across a flooring structure via one or more trolley wheels 106. One of the trolley wheels 106 may be engaged with a track wheel 106a. A track 23 may be engaged with one or more feet 20 along a length of the plant support structure 14. The track wheel 106a may engage a portion of the track 23 such that the trolley 100 (and consequently the light system 80) is prevented from moving laterally within an aisle 16 but is allowed to move along the length thereof. Other structures and/or methods may be used to prevent unwanted movement of a trolley 100 and/or light system 80 with respect to a plant support structure 14 without limitation unless so indicated in the following claims.

The light system 80 may be engaged with the trolley 100 at the trolley upright 104. A trolley upright 104 may be configured as a vertical beam, wherein one trolley upright 104 may be positioned on either side of a light system 80. The light system 80 may comprise an integrated air conduit 81 as previously described for other aspects of a growing system 10. It is contemplated that a light system 80 configured such as that shown in FIGS. 23A-23C may provide light and increased air and/or carbon dioxide flow to plants positioned adjacent the light system 80. An air and/or carbon dioxide source may be fluidly engaged with the air conduit 81 such that air and/or carbon dioxide flow exits the air conduit 81 in a direction toward one or more plants positioned adjacent the light system 80 via one or more apertures formed in the air conduit 81. The optimal air and/or carbon dioxide flow characteristics (e.g., pressure, velocity, volumetric flow rate, etc.) will vary at least depending on the type of plant, and are therefore in no way limiting to the scope of the present disclosure unless so indicated in the following claims. A light system 80 so configured may be moved horizontally at various intervals and/or at various times to provide equal average light and air and/or carbon dioxide flow to plants at various positions along the length of the plant support structure 14. In this manner, the length of the trolley 100 and/or light system 80 need not be equal to the length of the plant support structure 14. It is contemplated that the length of the trolley 100 and/or light system 80 may be less than that of the plant support structure 14, and further contemplated that in some applications the length of the trolley 100 and/or light system 80 may be equal to half that of the plant support structure 14. However, the scope of the present disclosure is in no way limited by the ratio of the length of the trolley 100 and/or light system 80 with respect to the plant support structure 14 unless so indicated in the following claims.

It should be noted that the various growing systems 10, plant support structures 14, and/or board frames 40 disclosed herein may be configured for use with modular grow boards 12. That is, as previously stated, the growing system 10, plant support structure 14, and/or board frame 40 may be configured such that a plurality of grow boards 12 may be simultaneously engaged with the board frame 40. Without limitation, the specific grow board 12 used with any embodiment of a growing system 10 may be any suitable grow board 12 for the particular application of the growing system 10, including but not limited to those disclosed in U.S. patent application Ser. No. 14/752,462.

Any shape, dimensions, and/or configuration of grow boards 12, plant support structures 14, feet 20, trays 30, board frames 40, uprights 41, intermediate rails 44, pans 47, nutrient delivery systems 50, light supports 60, light systems 80, collection members 90, and/or trolleys 100 and/or components of any of the foregoing may be used within the scope of the present disclosure without limitation unless so indicated in the following claims.

The materials used to construct the growing system 10 and various elements and/or components thereof will vary depending on the specific application thereof, but it is contemplated that polymers, metals, metal alloys, natural materials, fibrous materials, and/or combinations thereof may be especially useful for the growing system 10 in some applications. Accordingly, the above-referenced elements may be constructed of any material known to those skilled in the art or later developed, which material is appropriate for the specific application of the present disclosure without departing from the spirit and scope of the present disclosure unless so indicated in the following claims. It is contemplated that for certain applications it may be especially advantageous to construct the foot 20, board frame 40, and/or trolley 100 from metal and/or metallic alloys, and the trays 30, intermediate rails 44, pans 47, and/or other elements from plastic, polymers, and/or other synthetic materials. However, any suitable materials may be used to construct any element of the present disclosure without limitation unless so indicated in the following claims.

Having described the preferred embodiments, other features of the present disclosure will undoubtedly occur to those versed in the art, as will numerous modifications and alterations in the embodiments as illustrated herein, all of which may be achieved without departing from the spirit and scope of the present disclosure. Accordingly, the methods and embodiments pictured and described herein are for illustrative purposes only.

Any of the various features for the grow boards 12, plant support structures 14, feet 20, trays 30, board frames 40, uprights 41, intermediate rails 44, pans 47, nutrient delivery systems 50, light supports 60, light systems 80, collection members 90, and/or trolleys 100 and/or components of any of the foregoing may be used alone or in combination with one another (depending on the compatibility of the features) from one embodiment and/or aspect of the growing system 10 to the next. Accordingly, an infinite number of variations of the growing system 10 exists. All of these different combinations constitute various alternative aspects of the growing system 10. The embodiments described herein explain the best modes known for practicing the growing system 10 and will enable others skilled in the art to utilize the same. The claims are to be construed to include alternative embodiments to the extent permitted by the prior art. Modifications and/or substitutions of one feature for another in no way limit the scope of the growing system 10 and/or component thereof unless so indicated in the following claims.

It should be noted that the present disclosure is not limited to the specific embodiments pictured and described herein, but are intended to apply to all similar apparatuses and methods for arranging, growing, and/or harvesting plants, and/or otherwise providing any of the features and/or advantages of any aspect of the present disclosure. Modifications and alterations from the described embodiments will occur to those skilled in the art without departure from the spirit and scope of the present disclosure.

The invention claimed is:

1. A method of growing a plant, said method comprising:
   a. arranging a first plant support structure in a row, wherein said first plant support structure has a height, a width, and a length;
   b. arranging a second plant support structure in a second row, wherein said second plant support structure has a height, a width, and a length equal to said height, said width, and said length of said first plant support structure, respectively, and wherein said first plant support structure is laterally spaced from said second plant support structure so as to create an aisle between said first and second plant support structures;
   c. positioning a trolley in said aisle, wherein said trolley is engaged with a light system, wherein said light system is attached to an air conduit, and wherein said light system comprises:
      i. a support frame having a height, a width, and a thickness, wherein such support frame is substantially planar having a first surface and a second surface such that said first surface opposes said second surface, wherein a void is formed in said support frame and passes from said first surface to said second surface, wherein said air conduit is affixed to said support frame; and,
      ii. a light source positioned in said void, wherein said light source extends outward from said support frame beyond both said first surface and said second surface to provide light to plants on either side of said aisle simultaneously and wherein said trolley and said light system are moveable with respect to said first and second plant support structures along said lengths of said plant support structures.

2. The method according to claim 1 further comprising the step of moving said trolley along said lengths of said plant support structures at a specific interval.

3. The method according to claim 1 further comprising the step of directing a volumetric flow of air to said first and said second plant support structures from said air conduit.

4. A method of growing a plant, said method comprising:
   a. affixing an air conduit to a light system, wherein said light system comprises:
      i. a support frame having a height, a width, and a thickness, wherein such support frame is substantially planar having a first surface and a second surface such that said first surface opposes said second surface, wherein a void is formed in said support frame and passes from said first surface to said second surface, wherein said air conduit is affixed to said support frame; and,
      ii. a light source positioned in said void, wherein said light source extends outward from said support frame beyond both said first surface and said second surface such that light from said light source is directed from either side of the support frame simultaneously;
   b. arranging a first plant support structure in a row, wherein said first plant support structure has a height, a width, and a length;
   c. arranging a second plant support structure in a row, wherein said second plant support structure has a height, a width, and a length equal to said height, said width, and said length of said first plant support structure, respectively, and wherein said first plant support structure is laterally spaced from said second plant support structure so as to create an aisle between said first and second plant support structures;
   d. positioning said air conduit and said light system in said aisle; and,
   e. moving said air conduit and said light system within said aisle at a specific interval.

5. The method according to claim 4 further comprising the step of directing a volumetric flow of air to said first and said second plant support structures from said air conduit.

6. The method according to claim 5 wherein said air conduit is further defined as being in fluid communication with an HVAC system.

7. The method according to claim 6 wherein said light system further comprises a second light source, wherein said second light source is positioned above said air conduit and said light source is positioned below said air conduit.

8. The method according to claim 7 wherein said light system further comprising a first light cover on a first side of said light source and a second light cover on a second side of said light source, wherein said first and second light covers are engaged with said support frame.

9. The method according to claim 8 wherein said step of moving said air conduit and said light system is further defined as moving in a vertical dimension.

10. The method according to claim 8 wherein said step of moving said air conduit and said light system is further defined as moving in a horizontal dimension.

11. The method according to claim 8 further comprising a second light system, wherein said second light system is positioned below said light system, and wherein said second light system comprises:
   a. a support frame having a void formed therein, wherein said air conduit is affixed to said support frame; and,
   b. a light source positioned in said void.

12. The method according to claim 8 wherein said first light system and said second light system are further defined as being engaged with a trolley.

* * * * *